United States Patent
Subbaraman et al.

(10) Patent No.: US 9,195,005 B2
(45) Date of Patent: Nov. 24, 2015

(54) METHOD OF MANUFACTURING POLYMER OPTICAL WAVEGUIDES AND DEVICES THEREOF

(71) Applicants: Harish Subbaraman, Austin, TX (US); Ray T. Chen, Austin, TX (US)

(72) Inventors: Harish Subbaraman, Austin, TX (US); Ray T. Chen, Austin, TX (US)

(73) Assignee: Omega Optics, Inc., Austin, TX (US)

( * ) Notice: Subject to any disclaimer, the term of this patent is extended or adjusted under 35 U.S.C. 154(b) by 45 days.

(21) Appl. No.: 14/043,822

(22) Filed: Oct. 1, 2013

(65) Prior Publication Data
US 2015/0093515 A1 Apr. 2, 2015

(51) Int. Cl.
*B05D 5/06* (2006.01)
*G02B 6/138* (2006.01)
*G02F 1/065* (2006.01)
G02B 6/12 (2006.01)
G02F 1/21 (2006.01)

(52) U.S. Cl.
CPC ............ *G02B 6/138* (2013.01); *G02F 1/065* (2013.01); *G02B 2006/1219* (2013.01); *G02B 2006/12142* (2013.01); *G02B 2006/12145* (2013.01); *G02F 2001/212* (2013.01); *G02F 2201/063* (2013.01)

(58) Field of Classification Search
CPC .............. G02B 2006/1219; G02B 6/10–6/14; G02B 2006/1213
USPC ................................................ 427/160–169
See application file for complete search history.

(56) References Cited

U.S. PATENT DOCUMENTS

| | | | | |
|---|---|---|---|---|
| 6,144,795 | A * | 11/2000 | Dawes et al. ................. | 385/141 |
| 7,346,259 | B1 * | 3/2008 | Jen et al. ....................... | 385/145 |
| 2008/0305439 | A1 * | 12/2008 | Khan ............................ | 430/321 |
| 2009/0202713 | A1 * | 8/2009 | Pitwon ........................ | 427/163.2 |
| 2010/0247058 | A1 * | 9/2010 | Takasaki et al. .............. | 385/142 |
| 2010/0247870 | A1 * | 9/2010 | Suzuki et al. ................ | 428/172 |

* cited by examiner

*Primary Examiner* — Elizabeth Burkhart
(74) *Attorney, Agent, or Firm* — Taboada Law Firm, PLLC; John M. Taboada

(57) ABSTRACT

A fully additive method for forming optical waveguides and devices, such as thermo-optic polymer switches and electro-optic polymer modulators, is disclosed. A first polymer material of refractive index N1 is coated onto a suitable substrate to form a first cladding layer. The first cladding is then selectively patterned using a mold to form an impression of the waveguide core into the first cladding layer. Next, a core layer is formed by ink-jet printing onto the imprinted first cladding layer with a core material of refractive index N2 (N2>N1). The core layer is subsequently coated by ink-jet printing with a second polymer material of refractive index N3 (N3<N2) to form a second cladding, resulting in an optical waveguide. An electrode may be ink-jet printed before coating the first cladding material or after coating the second cladding material, or both before and after coating, in order to form active photonic devices.

19 Claims, 27 Drawing Sheets

METHOD OF MANUFACTURING POLYMER OPTICAL WAVEGUIDES AND DEVICES THEREOF

I. STATEMENT REGARDING FEDERALLY SPONSORED RESEARCH

The U.S. Government has a paid-up license in this invention and the right in limited circumstances to require the patent owner to license others on reasonable terms as provided for by the terms of the contracts FA9550-12-C-0052 awarded by the Air Force Office of Scientific Research.

II. BACKGROUND

1. Field of the Invention

The present disclosure relates generally to polymer photonics, and more particularly, to an additive method for manufacturing polymer optical waveguides and devices.

2. Background of the Invention

The statements in this section merely provide background information related to the present disclosure and may not constitute prior art.

A conventional method for polymer optical waveguide fabrication, illustrated in FIGS. 1A to 1C, uses exposure and other development processes to define the desired pattern into a resist coated on top of a substrate 11 with deposited first cladding 12 and core layer 13 materials, and further transferring the resist pattern to the core polymer via plasma etching. Upon patterning to form the waveguide cores 14, a second cladding layer 15 is deposited on top of the waveguide cores 14. This method, although straightforward, is not a cost-effective production method due to complicated fabrication processes and low throughput. The waveguides 14 also suffer from poor sidewall quality, thus increasing the waveguide loss.

Another conventional method for polymer optical waveguide fabrication is to directly expose the waveguide pattern in a photo-curable polymer core material using photolithography, and removing the unexposed material.

Both of the above conventional methods produce waveguides with relatively rough sidewalls. Additionally, since a lot of material is wasted during fabrication, an additional expense is added to the production of the waveguides.

A different method for forming optical waveguides for printed circuit boards was disclosed by Kim et al. (U.S. Pat. No. 8,265,445 B2). First, a first cladding layer is disposed on the base board. Next, an insulation layer is disposed on top of the first cladding layer. A through hole is formed in the insulation layer in order to accommodate waveguide cores. Next, a core material is filled into the hole. In order to planarize the surface, a thin transparent film is laid on top. After curing the core layer, the transparent film is removed. Although the method promises cost reduction compared to the conventional process via filling a limited quantity of core material in the through hole patterned in an insulating material, the process of light exposure and development of the core material to form waveguide channels does not eliminate unnecessary wastage of core material.

Alternatively, an all additive process can eliminate the use of chemicals for removal of materials, thus providing facile routes for developing polymer optical waveguide systems with low cost and without the harmful effects of etching.

Accordingly, several methods have been proposed for developing polymer optical waveguides incorporating fully additive techniques.

Ink-jet printing of core material directly on top of a polymer cladding material has been investigated. However, the waveguide structures have very poor aspect ratios and cannot be made thick enough for practical applications.

Molding/imprinting methods can effectively overcome some of these shortcomings by providing patterning capabilities at both micro- and nano-scales. Although extensive research has been conducted on using various kinds of molds to pattern the core trench for optical waveguides and devices, the predominant core forming technique has been via spin coating, which is not a viable manufacturing alternative, due to the material waste generated during spin coating.

III. SUMMARY

A low cost manufacturing alternative utilizing an additive process for fabricating waveguides is presented. The method may further be used to fabricate complete device structures comprising waveguide structures disposed in different ways to provide functionalities.

An aspect of the present invention provides a method of manufacturing polymer optical waveguides, comprising, forming alignment marks on the substrate; forming a first cladding layer; forming a core impression in the first cladding layer; forming a core layer on the first cladding layer; and forming a second cladding layer covering the core layer.

The substrate may comprise any rigid or flexible material, such as metal, a printed circuit board, plastic, wood, glass, semiconductor wafer, paper, or clothing. The rigid substrate may assume any shape. The flexible substrate may be in the form of a sheet or in the form of a roll. The substrate may comprise electronic circuitry on the backside, embedded within, or on top of the substrate, wherein the electronic circuitry is configured to transmit electrical signals. The substrate may comprise photonic circuitry on the backside, embedded within, or on top of the substrate, wherein the photonic circuitry is configured to transmit optical signals. The substrate may comprise complete integrated optoelectronic circuitry on the backside, embedded within, or on top of the substrate, wherein the optoelectronic circuitry is configured to transmit both electrical and optical signals. In the present invention, the alignment marks may comprise metal, dyes, color pigments, etc. which turn opaque upon hardening. Further, the alignment marks on the substrate may be patterned into any shape and size. The first cladding may comprise any optically transparent liquid material solution of refractive index N1 that may be hardened through the use of any of the plurality of curing methods, including but not limited to, heating; exposing to UV radiation; exposing to high power short light pulses; air drying. The forming of the first cladding layer may comprise: utilizing alignment marks on the substrate for determining position; applying the liquid material solution on the substrate; patterning the waveguide core pattern into the first cladding material; and hardening the first cladding layer to retain the core impression. Further, the core impression in the first cladding layer may comprise any of the plurality of single mode and multimode core patterns. The core material may comprise any optically transparent liquid material solution of refractive index N2, such that N2>N1, and that may be hardened through the use of any of the plurality of curing methods, including but not limited to, heating; exposing to UV radiation; exposing to high power short light pulses; air drying. The forming of the core layer may comprise: utilizing the alignment marks on the substrate to determine the position on the first cladding layer; applying the liquid material solution on top of the first cladding layer; filling the core impression in the first cladding layer with the core material; and hardening the core layer. The second cladding material may comprise any optically transparent liquid material solution of refractive index N3, such that N2>N3, and that may be hardened through the use of any of the plurality of curing methods, including but not limited to, heating; exposing to UV radiation; exposing to high power short light pulses, air drying. The forming of the second cladding layer may comprise: applying the liquid material solution on top of the core layer; and hardening the second cladding layer.

Another aspect of the present invention provides a method of manufacturing an active polymer optical waveguide device, comprising, a substrate; a first conductive layer patterned on the substrate; alignment marks patterned on the substrate; a first cladding layer comprising a core waveguide pattern; a core comprising the core material filling the trench in the first cladding layer; a second cladding layer covering the exposed parts of the core material; and a second conductive layer patterned on the second cladding layer.

The substrate may comprise any rigid or flexible material, such as metal, a printed circuit board, plastic, wood, glass, semiconductor wafer, paper, or clothing. The rigid substrate may assume any shape. The flexible substrate may be in the form of a sheet or in the form of a roll. The substrate may comprise electronic circuitry on the backside, embedded within, or on top of the substrate, wherein the electronic circuitry is configured to transmit electrical signals. The substrate may comprise photonic circuitry on the backside, embedded within, or on top of the substrate, wherein the photonic circuitry is configured to transmit optical signals. The substrate may comprise complete integrated optoelectronic circuitry on the backside, embedded within, or on top of the substrate, wherein the optoelectronic circuitry is configured to transmit both electrical and optical signals. The alignment marks on the substrate may comprise metal, dyes, color pigments, etc. which turn opaque upon hardening. Further, the alignment marks on the substrate may be patterned into any shape and size. A first conductive layer on top of the substrate may comprise any of the plurality of materials, including but not limited to, silver, copper, aluminum, gold, conductive polymers, graphene, and carbon nanotubes. Further, the first conductive layer may be patterned into any shape and size. The first cladding may comprise any optically transparent polymer material solution of refractive index N1 that may be hardened through the use of any of the plurality of curing methods, including but not limited to, heating; exposing to UV radiation; exposing to high power short light pulses; air drying. The forming of the first cladding layer may comprise: utilizing the alignment marks on the substrate to determine the position on the substrate; applying the liquid material solution on the substrate; patterning the waveguide core pattern into the first cladding material; and hardening the first cladding layer to retain the core impression. Further, the core impression in the first cladding layer may comprise any of the plurality of single mode or multimode core patterns. The core material may comprise any optically transparent liquid material solution of refractive index N2, such that N2>N1, and that may be hardened through the use of any of the plurality of curing methods, including but not limited to, heating; exposing to UV radiation; exposing to high power short light pulses; air drying. The forming of the core layer may comprise: utilizing the alignment marks on the substrate to determine the position on the first cladding layer; applying the liquid material solution on top of the first cladding layer; filling the core impression in the first cladding layer with the core material; and hardening the core layer. The second cladding material may comprise any optically transparent liquid material solution of refractive index N3, such that N2>N3, and that may be hardened through the use of any of the plurality of curing methods, including but not limited to, heating; exposing to UV radiation; exposing to high power short light pulses, air drying. The forming of the second cladding layer may comprise: utilizing the alignment marks on the substrate to determine the position on the core layer; applying the liquid material solution on top of the core layer; and hardening the second cladding layer. A second conductive layer on the second cladding layer may comprise any of the plurality of materials, including but not limited to, silver, copper, aluminum, gold nanoparticles, conductive polymers, graphene, and carbon nanotubes. The forming of the second conductive layer may comprise: utilizing the alignment marks on the substrate to determine the position on the second cladding layer; applying the conductive material solution; and curing it. Further, the second conductive layer may be patterned into any shape and size.

Still, another aspect of the present invention provides a method of manufacturing an active polymer optical waveguide device, comprising, a substrate; alignment marks on the substrate; a first cladding layer comprising a core waveguide pattern; a core comprising the core material filling the trench in the first cladding layer; a second cladding covering the exposed parts of the core material; and a patterned conductive layer on the second cladding layer.

The substrate may comprise any rigid or flexible material, such as metal, a printed circuit board, plastic, wood, glass, semiconductor wafer, paper, or clothing. The rigid substrate may assume any shape. The flexible substrate may be in the form of a sheet or in the form of a roll. The substrate may comprise electronic circuitry on the backside, embedded within, or on top of the substrate, wherein the electronic circuitry is configured to transmit electrical signals. The substrate may comprise photonic circuitry on the backside, embedded within, or on top of the substrate, wherein the photonic circuitry is configured to transmit optical signals. The substrate may comprise complete integrated optoelectronic circuitry on the backside, embedded within, or on top of the substrate, wherein the optoelectronic circuitry is configured to transmit both electrical and optical signals. The alignment marks on the substrate may comprise metal, dyes, color pigments, etc. which turn opaque upon hardening. Further, the alignment marks on the substrate may be patterned into any shape and size. The first cladding may comprise any optically transparent polymer material solution of refractive index N1 that may be hardened through the use of any of the plurality of curing methods, including but not limited to, heating; exposing to UV radiation; exposing to high power short light pulses; air drying. The forming of the first cladding layer may comprise: utilizing the alignment marks on the substrate to determine the position on the substrate; applying the liquid material solution on the substrate; patterning the waveguide core pattern into the first cladding material; and hardening the first cladding layer to retain the core impression. Further, the core impression in the first cladding layer may comprise any of the plurality of single mode or multimode core patterns. The core material may comprise any optically transparent liquid material solution of refractive index N2, such that N2>N1, and that may be hardened through the use of any of the plurality of curing methods, including but not limited to, heating; exposing to UV radiation; exposing to high power short light pulses; air drying. The forming of the core layer may comprise: utilizing the alignment marks on the substrate to determine the position on the first cladding layer; applying the liquid material solution on top of the first cladding layer; filling the core impression in the first cladding layer with the core material; and hardening the core layer. The second cladding material may comprise any optically transparent liquid material solution of refractive index N3, such that N2 >N3, and that may be hardened through the use of any of the plurality of curing methods, including but not limited to, heating; exposing to UV radiation; exposing to high power short light pulses, air drying. The forming of the second cladding layer may comprise: utilizing the alignment marks on the substrate to determine the position on the core layer; applying the liquid material solution on top of the core layer; and hardening the second cladding layer. A conductive layer on top of the second cladding layer may comprise any of the plurality of materials, including but not limited to, silver, copper, aluminum, gold, conductive polymers, ITO, graphene, and carbon nanotubes. The forming of the top conductive layer may comprise: utilizing the alignment marks on the substrate to determine the position on the second cladding layer; applying the conductive material solution; and curing it. Further, the top conductive layer may be patterned into any shape and size.

Other objectives and advantages of the present invention will become apparent from the following descriptions, taken in connection with the accompanying drawings, wherein, by way of illustration and example, embodiments of the present invention are disclosed.

IV. BRIEF DESCRIPTION OF THE DRAWINGS

The drawings constitute a part of this specification and include exemplary embodiments of the present invention, which may be embodied in various forms. The drawings described herein are for illustrative purposes only of selected embodiments and not of all possible implementations, and are not intended to limit the scope of the present disclosure in any way. It is to be understood that in some instances, various aspects of the present invention may be shown exaggerated or enlarged to facilitate an understanding of the invention.

A more complete and thorough understanding of the present invention and benefits thereof may be acquired by referring to the following description together with the accompanying drawings, in which like reference numbers indicate like features, and wherein.

V. DETAILED DESCRIPTION

Detailed Description of the Invention

Detailed descriptions of the preferred embodiments are provided herein. It is to be understood, however, that the present invention may be embodied in various forms. The specific details disclosed herein are not to be interpreted as limiting, but rather as a basis for the claims and as representative basis for teaching one skilled in the art to employ the present invention in virtually any appropriately detailed system, structure, or manner.

In all the accompanying drawings, same numerals are used within each figure to represent the same or similar materials, and redundant descriptions are omitted.

Figure 1A:
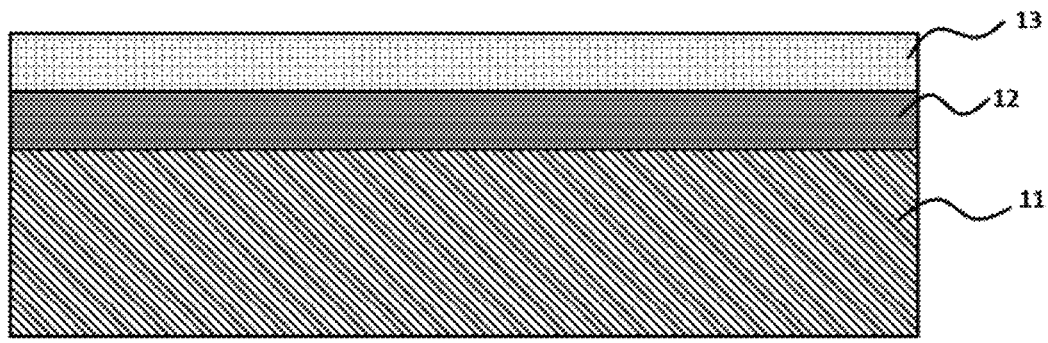
FIGS. 1A to 1C are cross sectional views of a conventional method of fabricating polymer optical waveguides.
Figure 1B:
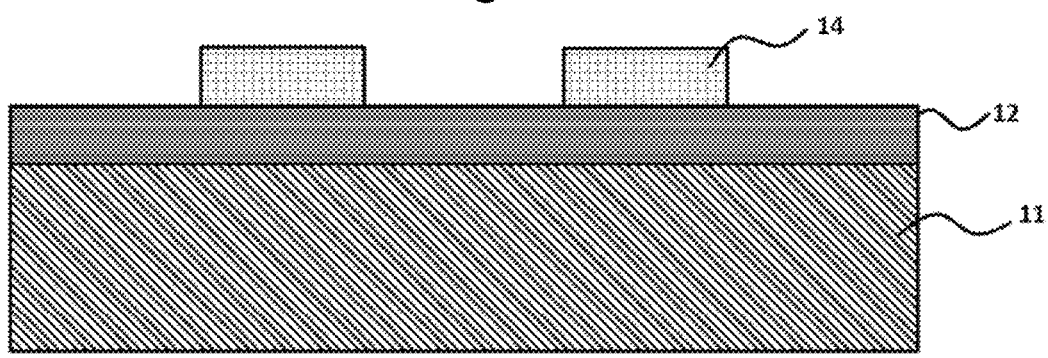
Figure 1C:
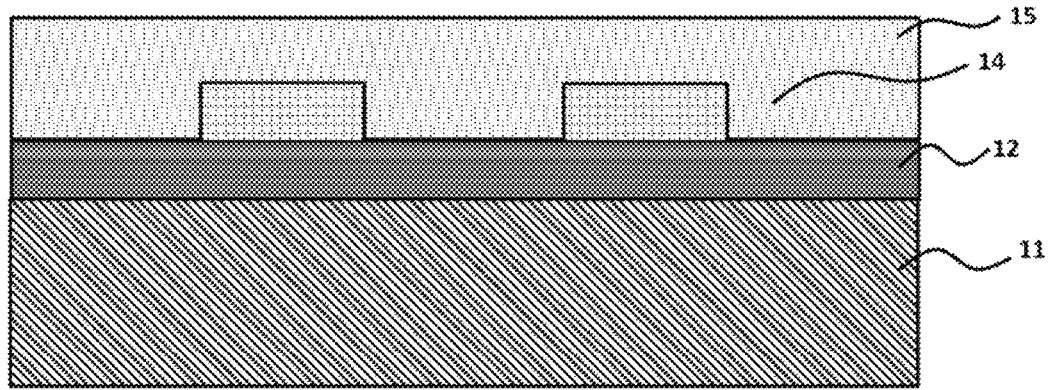

As shown in FIG. 1A, one of the intermediate working structures in waveguide fabrication using a conventional approach consists of a substrate 11, a first cladding 12 deposited on the substrate 11, and a core layer 13 deposited on top of the first cladding 12. The core layer 13 of FIG. 1A is then patterned using conventional lithography, and further developed to define waveguiding channels 14, as shown in FIG. 1B. Next, a second cladding layer 15 is deposited to cover the exposed regions of the core 14, as shown in FIG. 1C, thus completing the waveguide fabrication process. Such a process is a subtractive process, wherein a lot of the core material is removed from unintended regions. Such wastage of core material, and the utilization of cleanroom processes, makes the process expensive. An all additive manufacturing process, without the use of material removal methods, may lead to low cost manufacturing.

FIGS. 2A to 2H show the manufacturing process of polymer optical waveguides 100 according to one embodiment of the present invention.

Figure 2A:
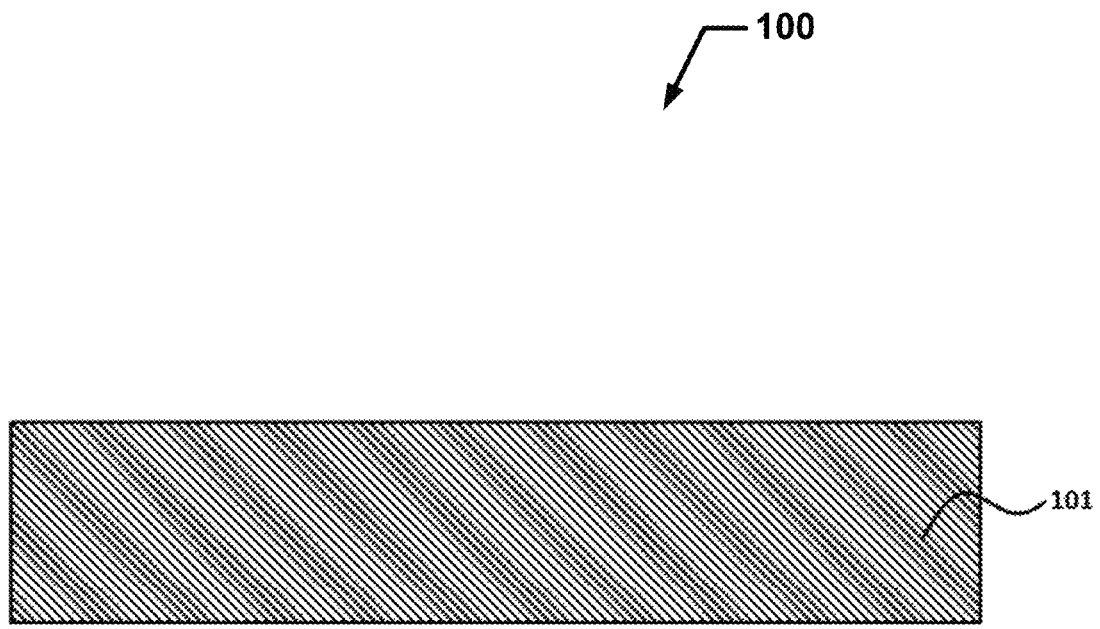
FIGS. 2A to 2H are cross sectional and top views of the manufacturing process of polymer optical waveguides according to an embodiment of the present invention.

Referring initially to FIG. 2A, the cross sectional view of a substrate 101 is shown. The substrate material may be rigid or flexible, and may be made of metal, plastic, wood, glass, semiconductor, paper, clothing, etc. In one embodiment, the substrate 101 comprises a silicon wafer. Moreover, the substrate may also be a printed circuit board comprising electrical circuits carrying electrical signals on the front side, embedded within, or on the backside of the substrate. The substrate may also contain optical circuits carrying optical signals on the front side, embedded within, or on the backside of the substrate.

Figure 2B:
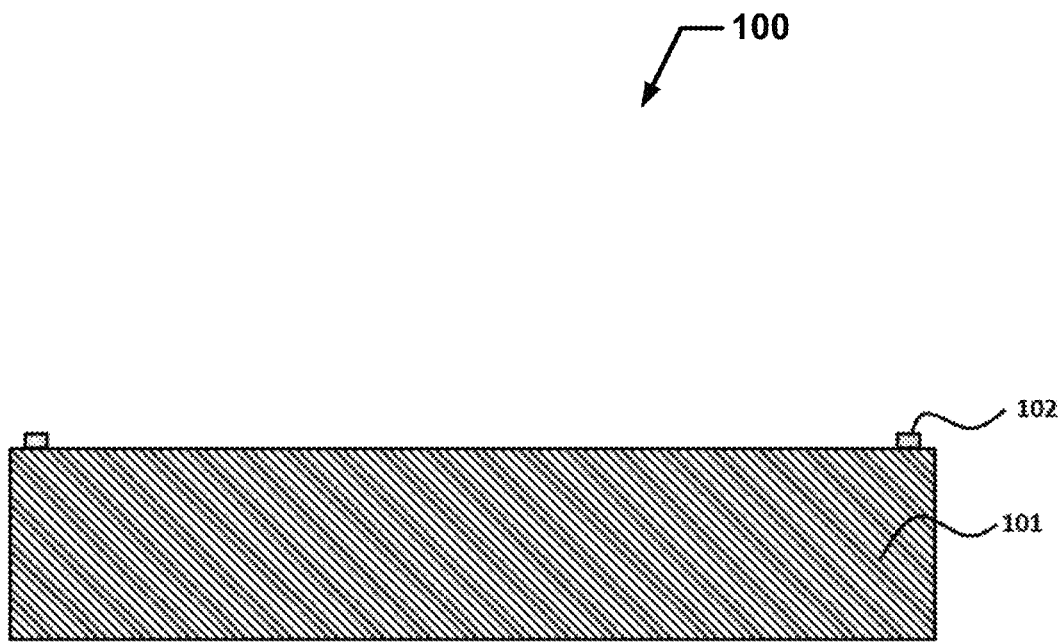

First, as shown in FIG. 2B, utilizing an ink-jet printer, alignment marks 102 are deposited on the substrate 101 and cured. The alignment marks may comprise metals, dyes, color pigments, etc. which turn opaque upon hardening and may be patterned into any shape and size. In one embodiment, the alignment marks 102 are formed by ink jet printing silver nanoparticle ink from Cabot Corp. One such ink jet printer is a Fujifilm Dimatix Materials Printer (DMP-2800). The printer utilizes a piezoelectric cartridge to jet material onto the desired area on the substrate. The range of materials that may be ink jetted is broad and depends on the material viscosity. The viscosity should range between 10 and 12 cPs ($1.0 \times 10^{-2}$ to $1.2 \times 10^{-2}$ Pa·s) and the surface tension should range between 28 and 33 dynes/cm (0.028 to 0.033 N/m) at operating temperature. This type of a non-contact printing method can easily be extended to a roll-to-roll process.

Figure 2C:
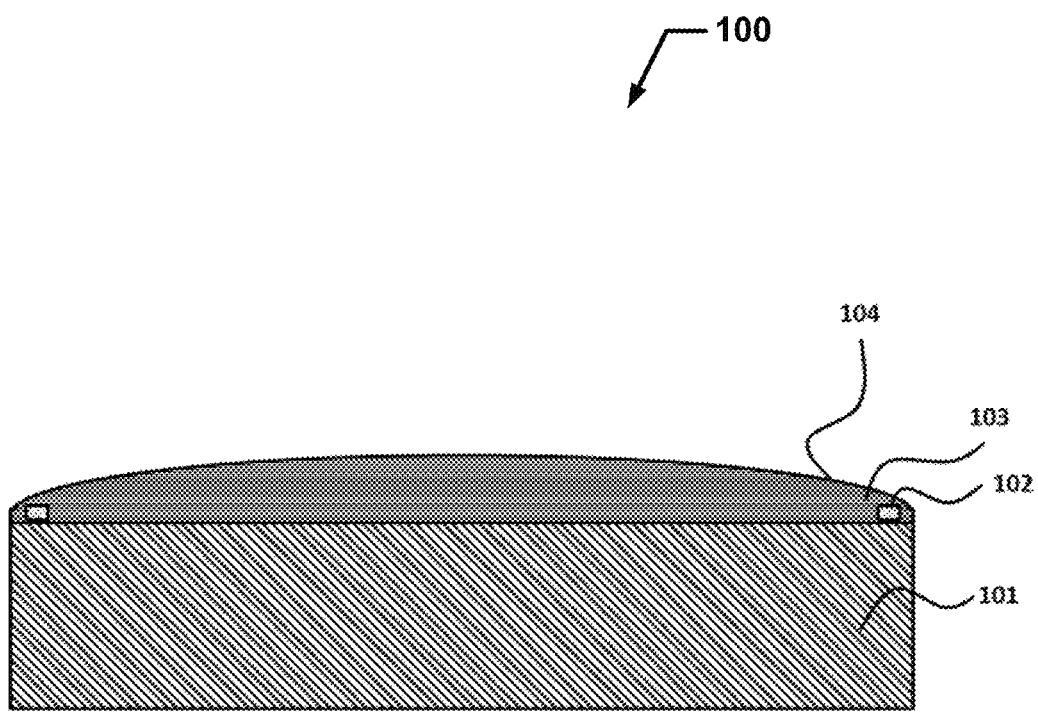

Second, as shown in FIG. 2C, a layer of first cladding polymer material 103 of refractive index N1 is ink jet printed on the substrate 101. In one embodiment, the first cladding layer 103, comprises a UV15LV polymer from MasterBond. The refractive index of the UV15LV polymer is 1.501 at a wavelength of 1550 nm. UV15LV was chosen as the first cladding layer since it enables patterning of the core waveguide trench using an imprinting technique. The location of printing is determined with the aid of the alignment marks 102. Due to the nature of printing, the printed first cladding layer may assume a non-planar surface profile 104 which is planarized in subsequent processing steps. Depending on the thickness of the first cladding material required for different applications, multiple layers can be printed on top of each other to achieve the desired thickness. The method used for depositing the first cladding layer may include any of the plurality of solution processing techniques, such as screen printing, gravure, offset, or blade coating.

Figure 2D:
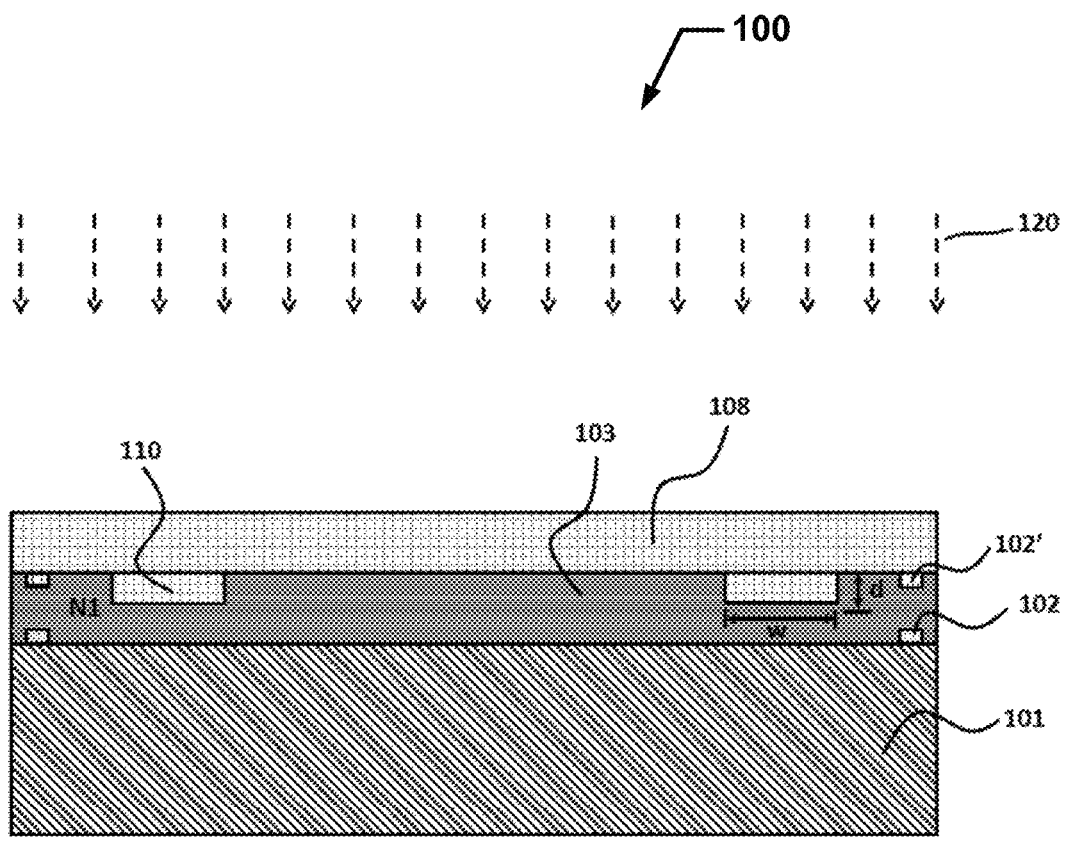

Third, as shown in FIG. 2D, a transparent mold 108, made of a suitable material, such as silsesquioxane (SSQ), containing the core pattern 110 of the waveguides and alignment marks 102', is utilized to form an impression of the waveguide cores into the first cladding layer. In order to determine the position of the waveguides on the substrate, the alignment marks 102' and 102 are aligned using an optical alignment system, and the mold is pressed into the first cladding material 103. Pressure is applied in order remove any air bubbles in the first cladding material. It is to be noted that any appropriate rigid or flexible material can be used to form the transparent mold.

Ultra-violet (UV) radiation 120 is shone through the transparent mold 108 onto the first cladding material 103 until the first cladding material hardens. The small layer in the first cladding layer between the core pattern and the substrate is called a residual layer. The residual layer thickness can be controlled by appropriately choosing a suitable thickness for the first cladding layer. It is to be noted that if the substrate is transparent, UV radiation may also be shone through the substrate in order to harden the first cladding material. In some embodiments where the mold is not transparent to UV, other methods to cure and harden the first cladding layer may be utilized, such as heating the first cladding and/or air drying the first cladding layer.

Figure 2E:
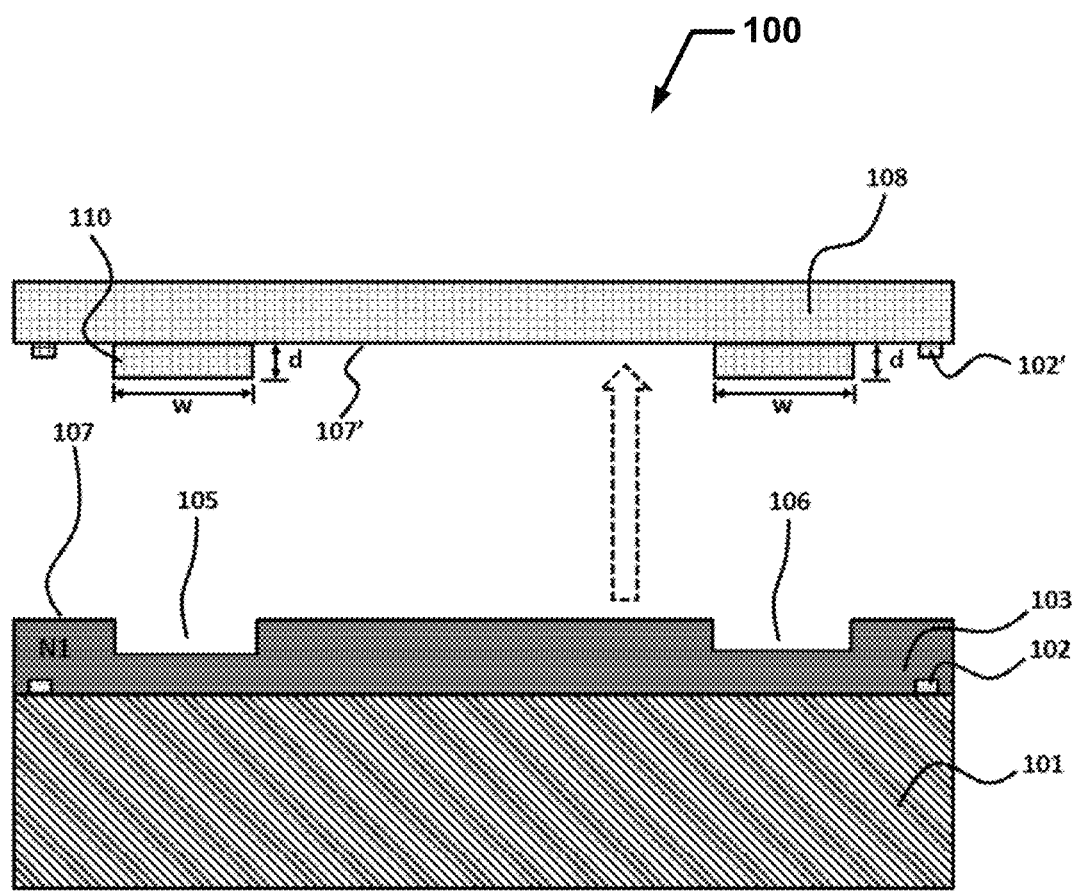
Figure 2F:
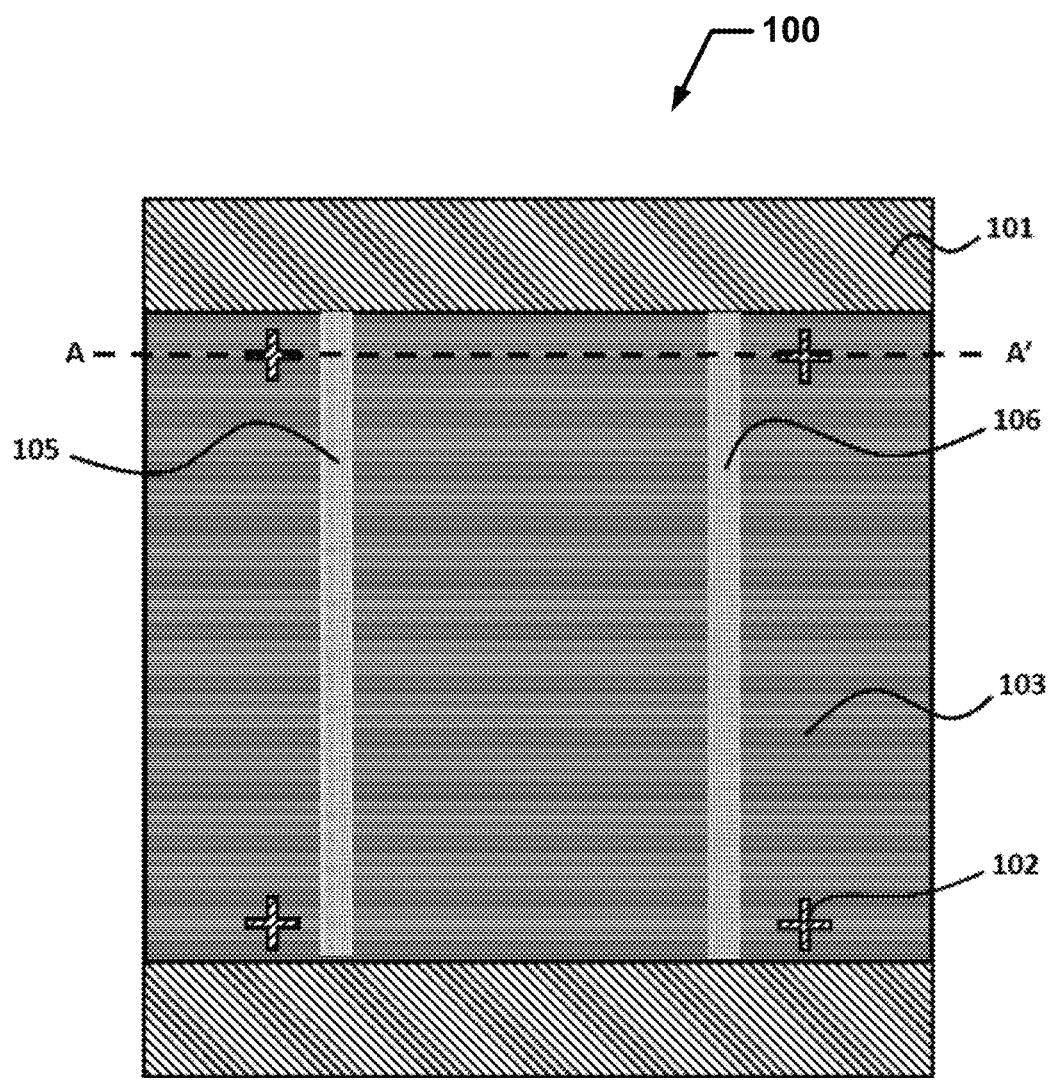

Fourth, as shown in FIG. 2E, the transparent mold 108 is separated from the waveguide system, leaving an impression of the core patterns 105 and 106 in the first cladding layer 103. The layer between the bottom of the impression of the core patterns and the substrate is the residual layer. The first cladding layer assumes a flat surface profile 107 due to the flatness of the mold surface 107'. A top view of the waveguide is shown in FIG. 2F. The four registration marks 102, the core pattern impressions 105 and 106, the substrate 101, and the first cladding layer 103 are all visible. The cross sectional views for FIGS. 2A to 2E, FIG. 2G, and FIG. 2H are taken along the dashed line A-A'.

Figure 2G:
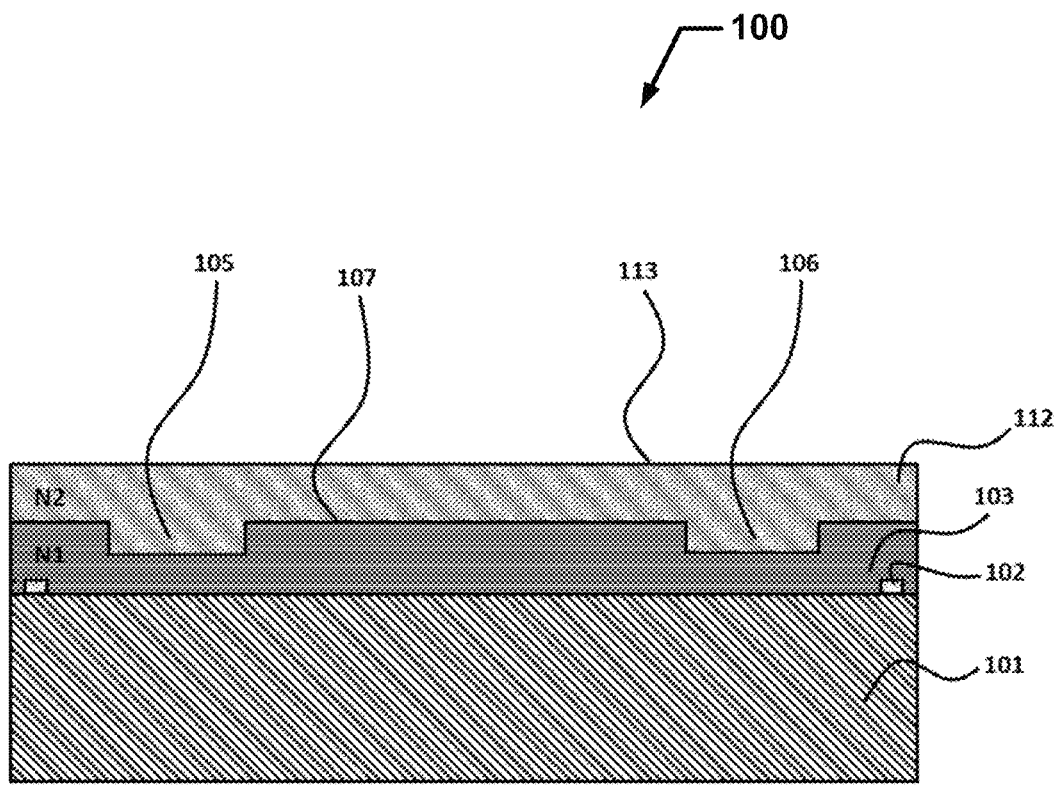

Fifth, as shown in FIG. 2G, the core material solution 112 of refractive index N2 (N2>N1) is deposited on top of the first cladding layer 103 using ink jet printing. In one embodiment, the core material solution 112, comprises SU8-2000.5 (SU8) polymer from MicroChem. The core material solution has a refractive index of 1.575 at a wavelength of 1550 nm, which is larger than the refractive index of the first cladding layer comprising UV15LV. In order to determine the position of printing on top of the first cladding layer, the alignment marks 102 are detected using an optical alignment system, and the position of printing is determined with respect to the position of the detected alignment marks. The deposited material covers the core pattern impressions 105 and 106 in the first cladding layer, and also assumes a flat top surface 113. The deposited core material solution is then hardened using an appropriate curing method, such as exposure to UV radiation, heating, air drying.

Figure 2H:
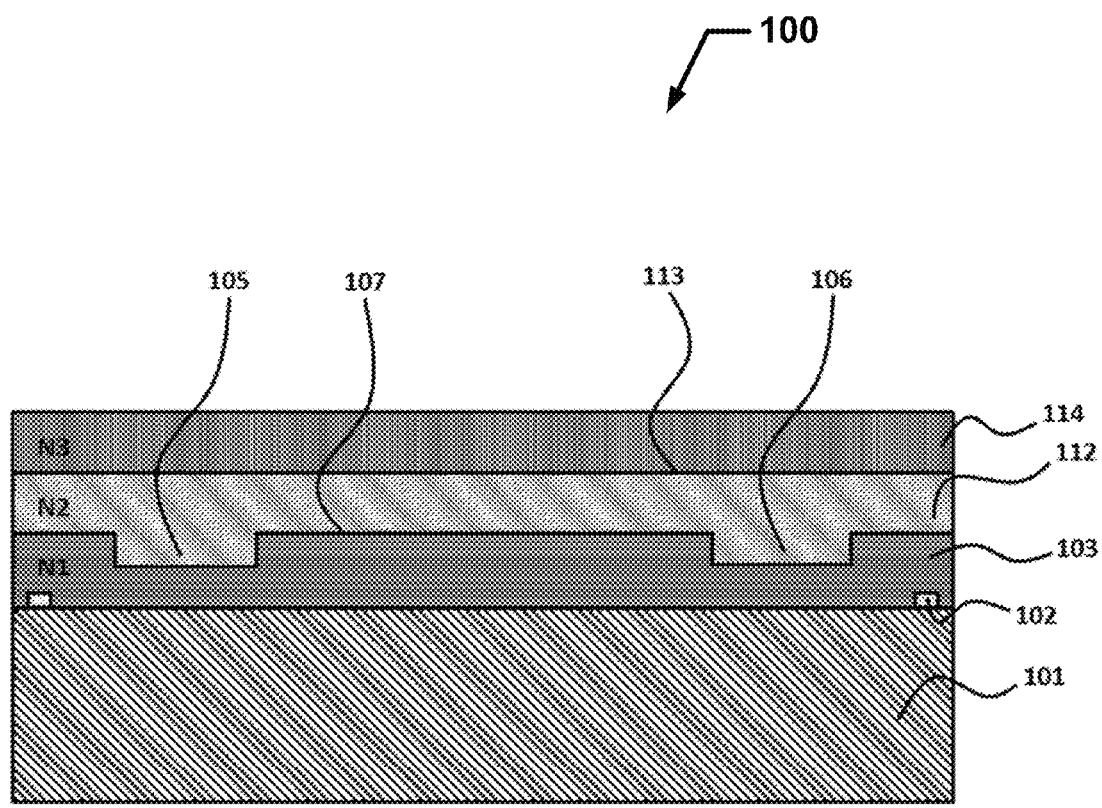

Finally, as shown in FIG. 2H, the second cladding material solution 114 of refractive index N3 (N3<N2) is deposited on top of the core layer 112 using ink jet printing. In one embodiment, the second cladding layer 114, comprises UFC-170A polymer from URAY Co. Ltd. UFC-170A polymer has a refractive index of 1.496 at a wavelength of 1550 nm. UV15LV polymer could have also been chosen as the second cladding. In order to determine the position of printing on top of the core layer, the alignment marks 102 are detected using an optical alignment system, and the position of printing is determined with respect to the position of the detected alignment marks. After deposition, the second cladding layer is hardened using an appropriate curing method, such as exposure to UV radiation, heating, air drying; thus completing the optical waveguide system fabrication.

The optical waveguide system formed with this method may be fabricated on any substrate material, and over large physical areas not possible using conventional fabrication approaches. The utilization of ink jet printing enables deposition of material only at intended locations on the substrate, thereby eliminating wastage of expensive cladding and core materials. The method disclosed herein also eliminates using wet or dry etching to remove material, thus, further preventing material wastage. Moreover, the utilization of solution processing techniques makes the disclosed invention roll-to-roll compatible, thus lending itself to low cost, high rate manufacturing.

The present invention is illustrated more fully by way of examples. It should be noted, however, that these examples in no way limit the scope of the invention.

FIGS. 3A to 3I show the manufacturing process of an active EO polymer optical modulator 200 according to another embodiment of the present invention.

Figure 3A:
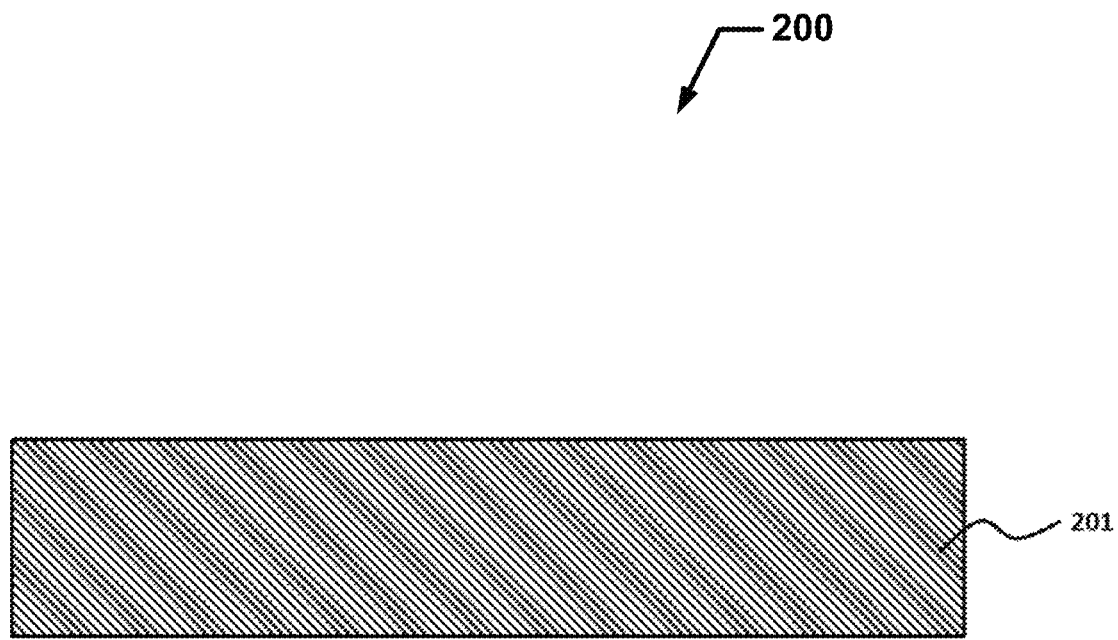
FIGS. 3A to 3I are cross sectional and top views of the manufacturing process of an active electro-optic (EO) polymer optical modulator according to another embodiment of the present invention.

First, as shown in FIG. 3A, a substrate 201 is chosen for the device system. The substrate material may be rigid or flexible, and may be made of metal, plastic, wood, glass, semiconductor, paper, clothing, etc. In one embodiment, the substrate 201 comprises a silicon wafer. Moreover, the substrate may also be a printed circuit board comprising electrical circuits carrying electrical signals on the front side, embedded within, or on the backside of the substrate. The substrate may also contain optical circuits carrying optical signals on the front side, embedded within, or on the backside of the substrate.

Figure 3B:
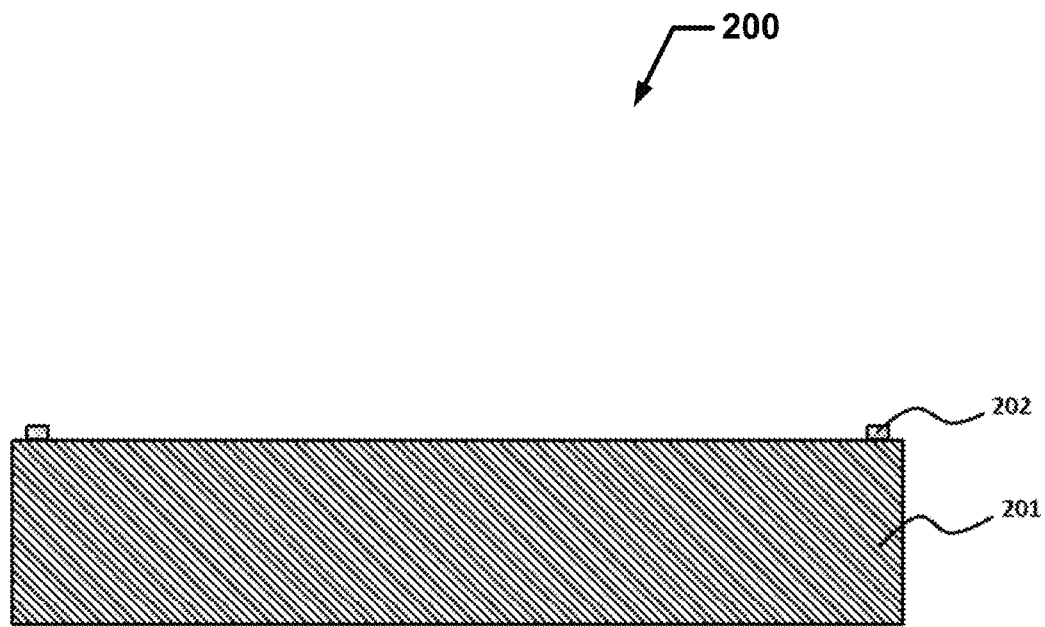
Figure 3C:
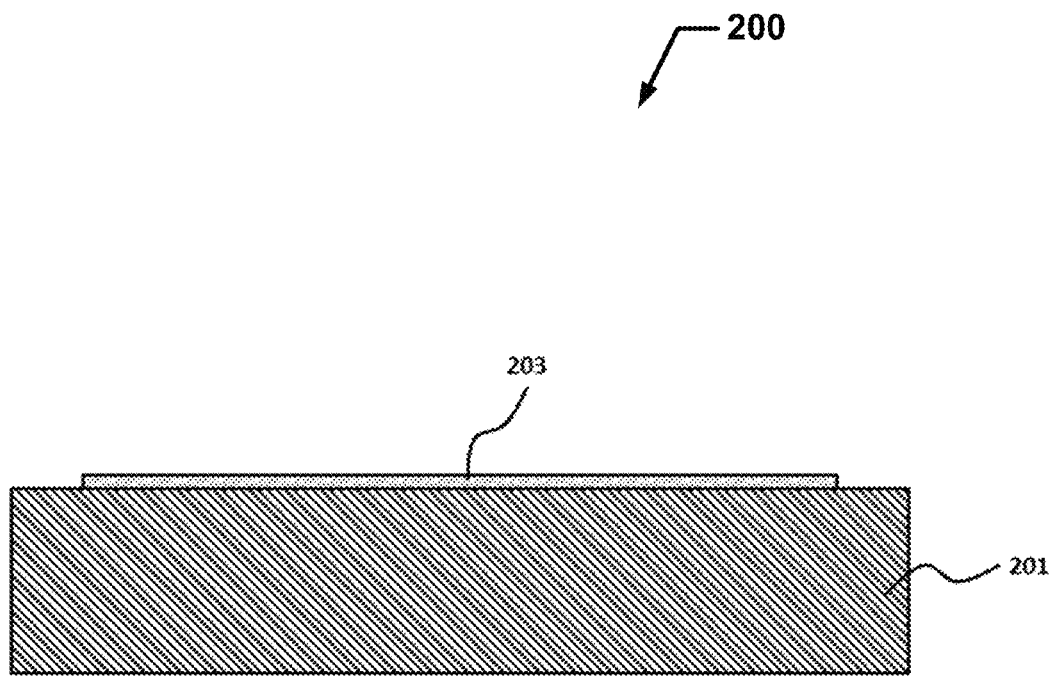

Second, as shown in FIG. 3B, alignment marks 202 are ink jet printed on the substrate 201 and cured in order to aid in the subsequent processing steps. The alignment marks may comprise metals, dyes, color pigments, etc. which turn opaque upon hardening and may be patterned into any shape and size. In one embodiment, the alignment marks 202 are formed by ink jet printing silver nanoparticle ink from Cabot Corp. One such ink jet printer is a Fujifilm Dimatix Materials Printer (DMP-2800). The printer utilizes a piezoelectric cartridge to jet material onto the desired area on the substrate. The range of materials that may be ink jetted is broad and depends on the material viscosity. The viscosity should range between 10 and 12 cPs ($1.0 \times 10^{-2}$ to $1.2 \times 10^{-2}$ Pa·s) and the surface tension should range between 28 and 33 dynes/cm (0.028 to 0.033 N/m) at operating temperature. This type of a non-contact printing method can easily be extended to a roll-to-roll process. Next, as shown in FIG. 3C, a first conductive electrode 203 is ink-jet printed onto the substrate 201 and cured. In one embodiment, the 350 nm to 400 nm first conductive electrode 203 is formed by ink jet printing silver nanoparticle ink from Cabot Corp and cured at 90° C. for 4 minutes. In the cross section of FIG. 3C, the first conductive electrode is at a different position along the device than the alignment marks, thus the alignment marks are not visible in the cross section of FIG. 3C. For this same reason, most of the following cross sectional views do not show the alignment marks. In order to determine the position of printing the first conductive electrode on the substrate, the alignment marks 202 illustrated in FIG. 3B are detected using an optical alignment system, and the position of printing is determined with respect to the position of the detected alignment marks. The first conductive electrode may include any of the plurality of materials, including but not limited to, silver, copper, aluminum, gold, nickel, conductive polymers, conductive metal oxides, graphene, and carbon nanotubes. The alignment marks and the first conductive electrodes may be cured using any of the plurality of curing methods, including but not limited to, heating; exposing to UV radiation; exposing to high power short light pulses; air drying.

Figure 3D:
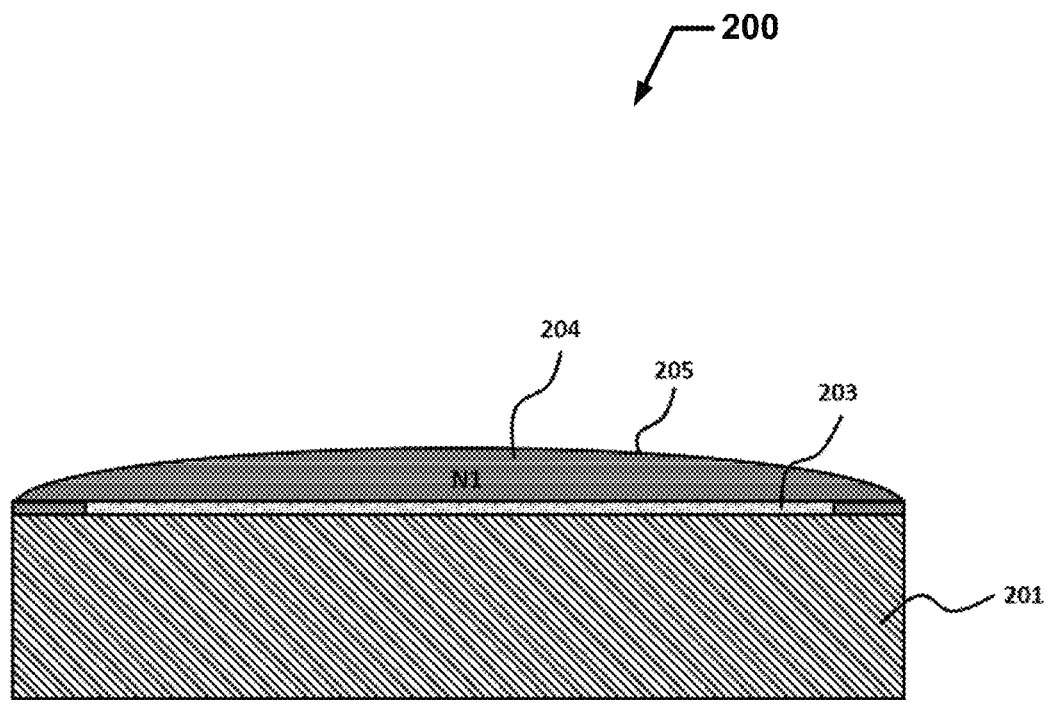

Third, as shown in FIG. 3D, a layer of first cladding polymer material 204 of refractive index N1 is ink-jet printed on top the first conducting electrode 203 and cured. In one embodiment, the first cladding layer 204, comprises a 4.18 μm thick UV15LV polymer from MasterBond. The refractive index of the UV15LV polymer is 1.501 at a wavelength of 1550 nm. UV15LV was chosen as the first cladding layer since it enables patterning of the core waveguide trench using an imprinting technique. In order to determine the position of printing the first cladding material on the substrate, the alignment marks 202 illustrated in FIG. 3B are detected using an optical alignment system, and the position of printing is determined with respect to the position of the detected alignment marks. Due to the nature of printing, the printed first cladding layer may assume a non-planar surface profile 205 which is planarized in subsequent processing steps. Depending on the thickness of the first cladding layer required for different applications, multiple layers can be printed on top of each other using ink jet printing to achieve the desired thickness. It is to be noted that apart from ink jet printing, the method used for depositing the first cladding layer may include any of the plurality of solution deposition techniques, such as screen printing, gravure, offset, or blade coating.

Figure 3E:
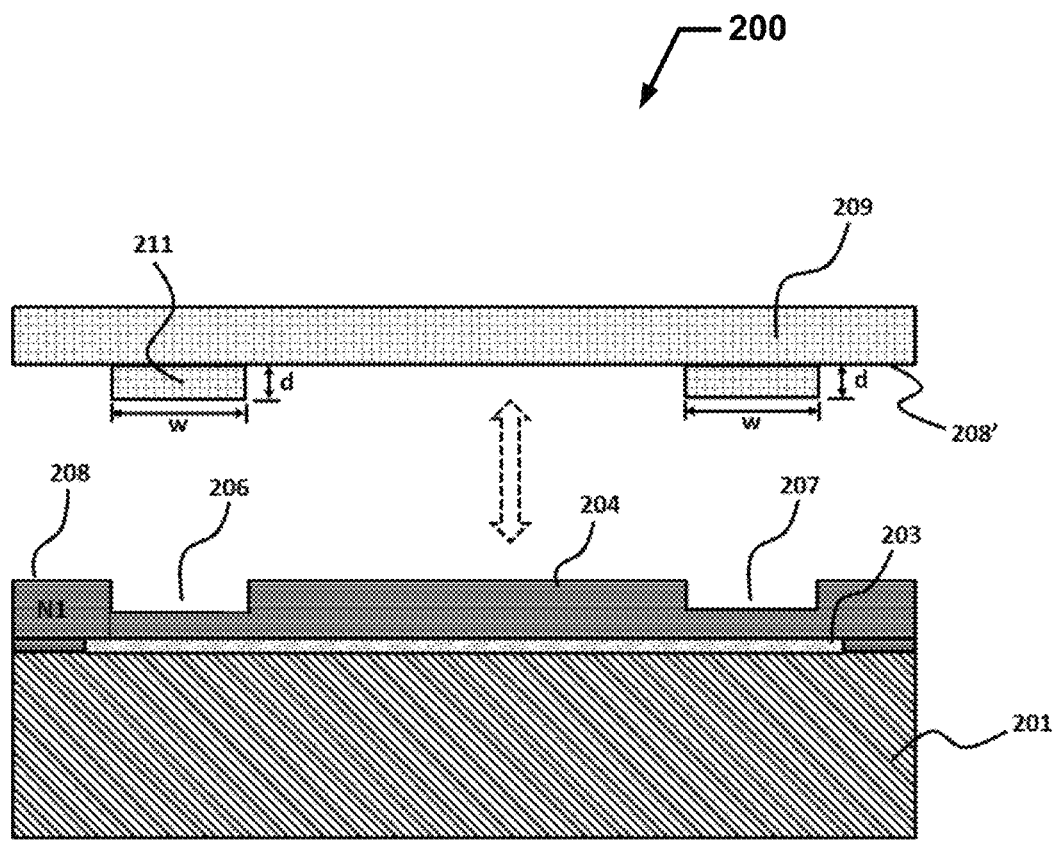
Figure 3F:
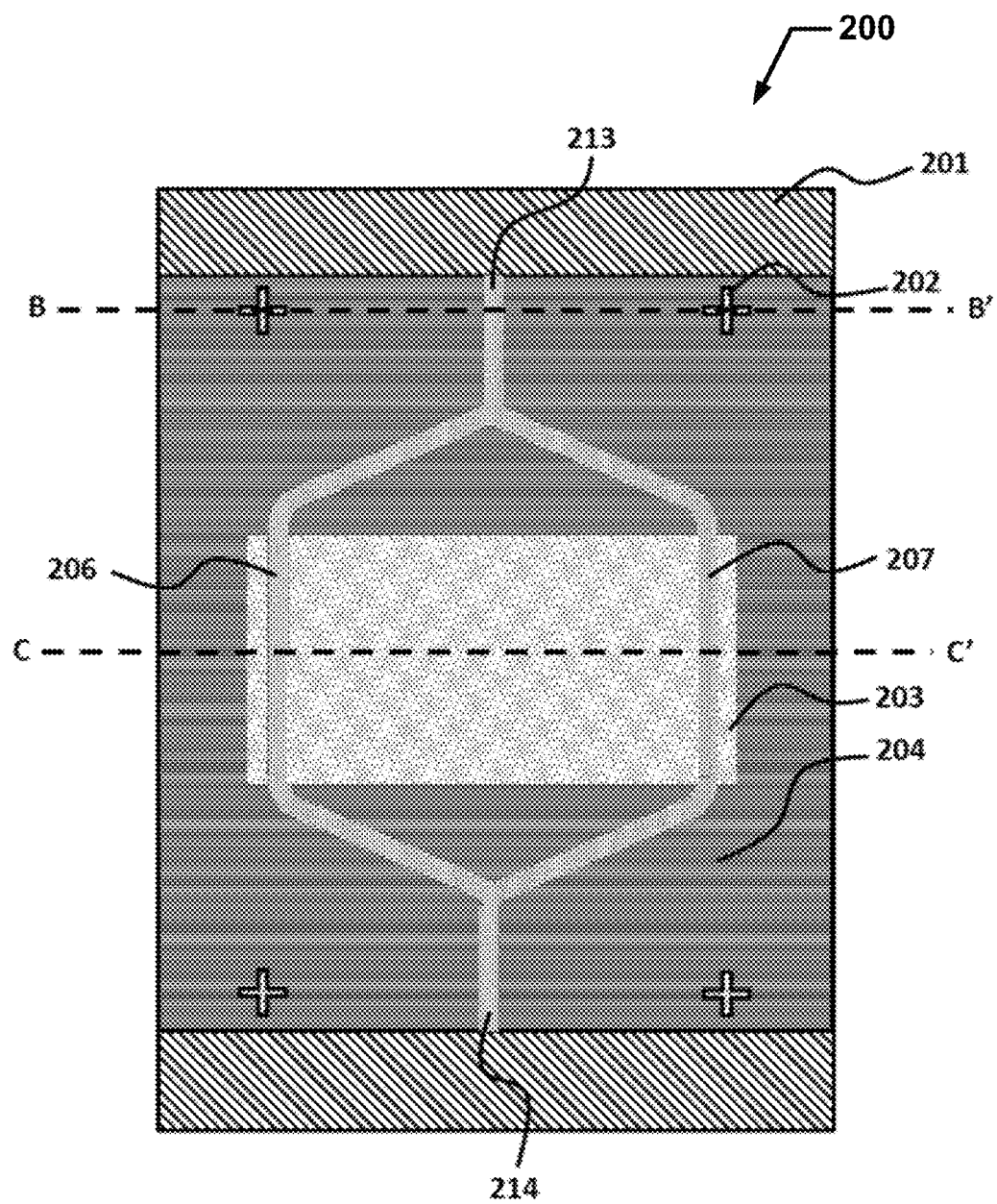

Fourth, as shown in FIG. 3E, a transparent mold 209, made of an appropriate material such as SSQ, containing the core trench pattern 211 of the modulator and alignment marks, is pressed into the first cladding material 204. The cross sectional view shown in FIG. 3E is taken along the central active region of the device, thus the alignment marks, input waveguide, and output waveguide are not illustrated. In order to determine the position of the waveguides on the substrate, the alignment marks on the transparent mold and the alignment marks previously printed on the substrate are aligned using an optical alignment system, and the mold is pressed into the first cladding material 204. Pressure is applied in order remove any air bubbles in the first cladding material. Ultra-violet (UV) radiation is shone for roughly 5 minutes through the transparent mold system 209 onto the first cladding material 204 until the first cladding material hardens, leaving a small residual layer in the first cladding layer. The residual layer thickness can be controlled by appropriately choosing a suitable thickness for the first cladding layer. In some embodiments where the mold is not transparent to UV, other methods to cure and harden the first cladding layer may be utilized, such as heating the first cladding, exposing the first cladding layer to high power, ultrashort light pulses, and/or air drying the first cladding layer. Following UV exposure and hardening, the transparent mold is detached from the device, producing an impression of the core patterns 206 and 207 of the device in the first cladding layer 204. The core patterns 206 and 207 in the first cladding layer and the first cladding top surface 208 assume a flat profile due to the flatness of the mold surface 208'. The imprinting process produces an inverse rib waveguide with a depth of 500 nm and a width of 4.75 μm. A top view of the active polymer optical modulator after completion of the fourth step is shown in FIG. 3F. The cross sectional views for FIGS. 3A and 3B are taken along the dashed line B-B'. The cross sectional views for FIGS. 3C to 3E and FIGS. 3G to 3I are taken along the dashed line C-C'. As shown in FIG. 3F, the first conductive electrode 203 and the alignment marks 202 are formed on the substrate 201. A modulator core pattern comprising two arms 206 and 207 is formed in the first cladding layer 204. The input 213 and the output 214 waveguides are also shown.

Figure 3G:
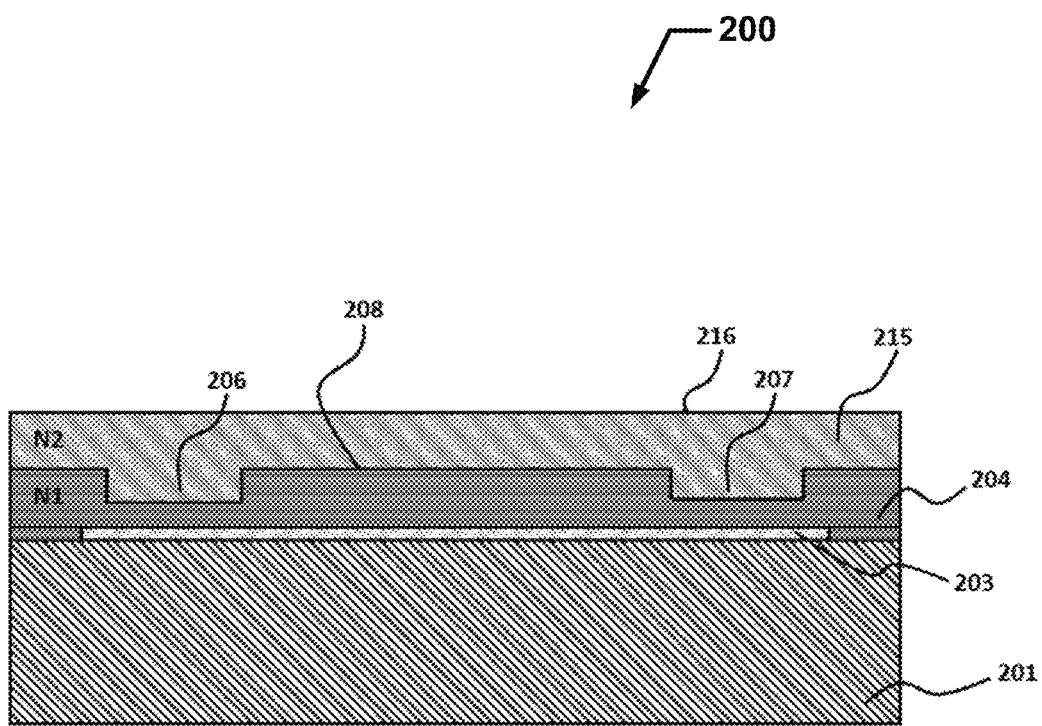

Fifth, as shown in FIG. 3G, the core material solution 215 of refractive index N2 (N2>N1) is deposited on top of the patterned first cladding layer 204 using ink jet printing. The core material may comprise any material solution with a non-zero electro-optic coefficient. The deposited material covers the core pattern impressions 206 and 207 in the first cladding layer, and also assumes a flat top surface 216. The deposited core material solution is then hardened using an appropriate curing method, such as exposure to UV radiation, heating, or air drying. In one embodiment, the core material solution 215 comprises a 1.8 mm thick in the slab region with an additional 0.5 μm in the rib waveguide region electro-optic polymer from Soluxra, LLC having a refractive index of 1.63 at a wavelength of 1550 nm. It is to be noted that apart from ink jet printing, the method used for depositing the core material may include any of the plurality of solution deposition techniques, such as screen printing, gravure, offset, or blade coating.

Figure 3H:
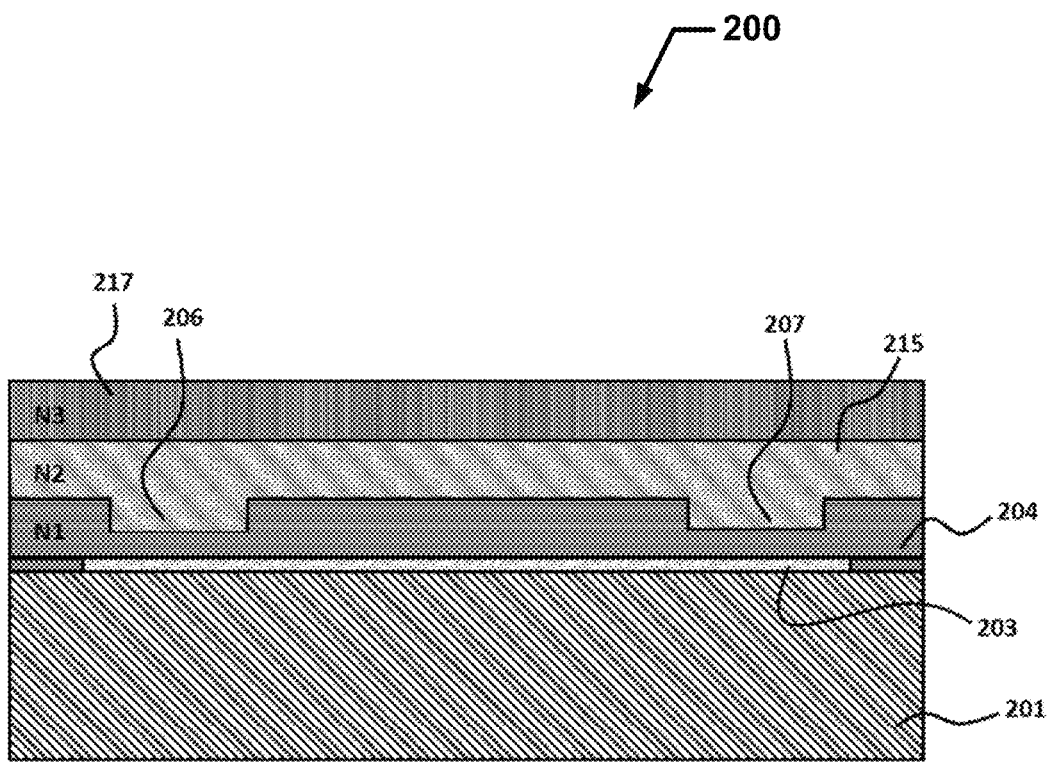

Sixth, as shown in FIG. 3H, the second cladding material solution 217 of refractive index N3 (N3<N2) is deposited on top of the core layer 215 using ink jet printing. In one embodiment, the second cladding layer 217, comprises a 3 μm thick UFC-170A polymer from URAY Co. Ltd. UFC-170A polymer has a refractive index of 1.496 at a wavelength of 1550 nm. UV15LV polymer could have also been chosen as the second cladding. Upon deposition, the layer is hardened using an appropriate curing method, such as exposure to UV radiation, heating, or air drying. It is to be noted that apart from ink jet printing, the method used for depositing the second cladding material may include any of the plurality of solution deposition techniques, such as screen printing, gravure, offset, or blade coating.

Figure 3I:
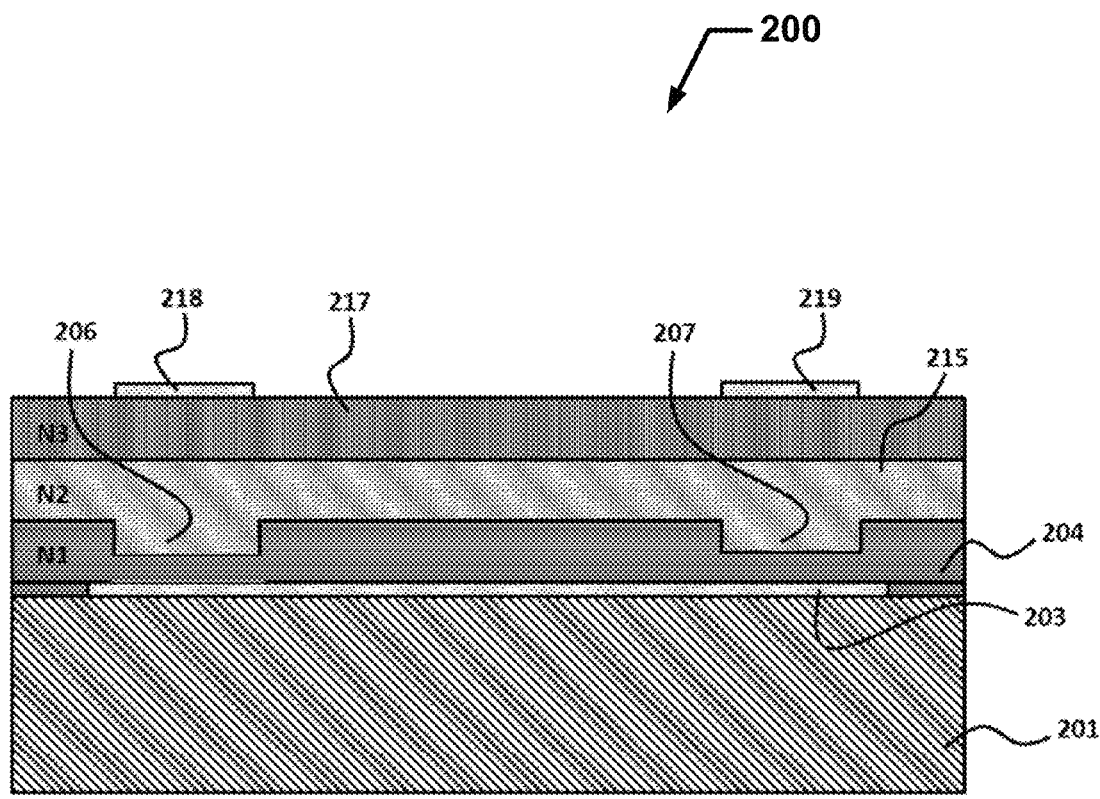

Finally, as shown in FIG. 3I, utilizing the alignment marks on the substrate and a camera such as a fiducial recognition camera, second conductive electrode patterns 218 and 219 are ink jet printed on the second cladding layer right over the two arms 206 and 207 of the modulator. The second conductive electrodes may include any of the plurality of materials, including but not limited to, silver, copper, aluminum, gold, nickel, conductive polymers, conductive metal oxides, graphene, and carbon nanotubes. In one embodiment, the second conductive electrodes are formed by ink jet printing silver nanoparticle ink from Cabot Corp. and comprise a length of 7.1 mm and are separated from the first ground electrode by 8.3 μm. Moreover, the second conductive electrode patterns may be of any shape and size. Upon printing, the second conductive electrodes are appropriately cured using any of the plurality of methods, including but not limited to, heating; exposing to UV radiation; exposing to high power short light pulses; air drying. Thus completing the active polymer optical modulator fabrication.

The polymer optical modulator 200 formed in this way may be fabricated on any substrate material, and over large physical areas not possible using conventional fabrication approaches. The utilization of ink jet printing, enables deposition of material only at intended locations on the substrate, thereby eliminating wastage of expensive cladding and core materials. The method disclosed herein also eliminates using wet or dry etching to remove material, thus, further preventing material wastage. Moreover, the utilization of solution processing techniques makes the disclosed invention roll-to-roll compatible, thus lending itself to low cost, high rate manufacturing.

FIGS. 4A to 4H show manufacturing process of an active TO polymer optical switch 300 according to another embodiment of the present invention.

Figure 4A:
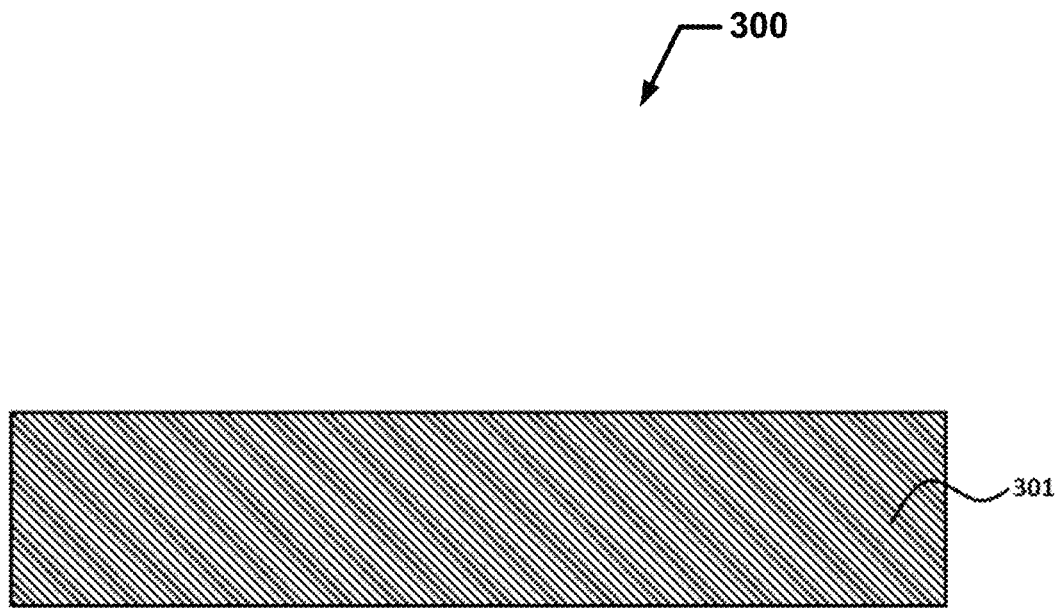
FIGS. 4A to 4H are cross sectional and top views of the manufacturing process of an active thermo-optic (TO) polymer optical switch according to another embodiment of the present invention.

First, as shown in FIG. 4A, a substrate 301 is chosen for the active polymer optical switch. The substrate material may be rigid or flexible, and may be made of metal, plastic, wood, glass, semiconductor, paper, clothing, etc. In one embodiment, the substrate 301 comprises a silicon wafer. Moreover, the substrate may also be a printed circuit board comprising electrical circuits carrying electrical signals on the front side, embedded within, or on the backside of the substrate. The substrate may also contain optical circuits carrying optical signals on the front side, embedded within, or on the backside of the substrate.

Figure 4B:
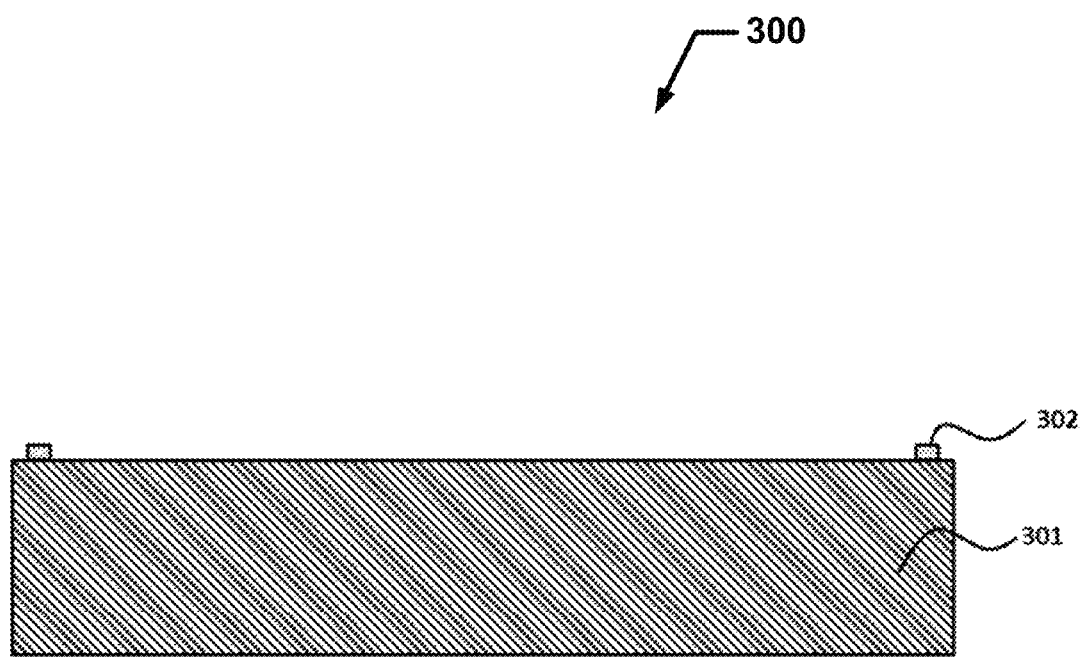

Second, as shown in FIG. 4B, alignment marks 302 are ink jet printed onto the substrate 301 in order to aid in the subsequent processing steps. The alignment marks may comprise of metals, dyes, color pigments, etc. which turn opaque upon hardening and may be patterned into any shape and size. The alignment marks may be cured using any of the plurality of curing methods, including but not limited to, heating; exposing to UV radiation; exposing to high power short light pulses; air drying. In one embodiment, the alignment marks 302 are formed by ink jet printing silver nanoparticle ink from Cabot Corp. One such ink jet printer is a Fujifilm Dimatix Materials Printer (DMP-2800). The printer utilizes a piezoelectric cartridge to jet material onto the desired area on the substrate. The range of materials that may be ink jetted is broad and depends on the material viscosity. The viscosity should range between 10 and 12 cPs ($1.0 \times 10^{-2}$ to $1.2 \times 10^{-2}$ Pa·s) and the surface tension should range between 28 and 33 dynes/cm (0.028 to 0.033 N/m) at operating temperature. This type of a non-contact printing method can easily be extended to a roll-to-roll process.

Figure 4C:
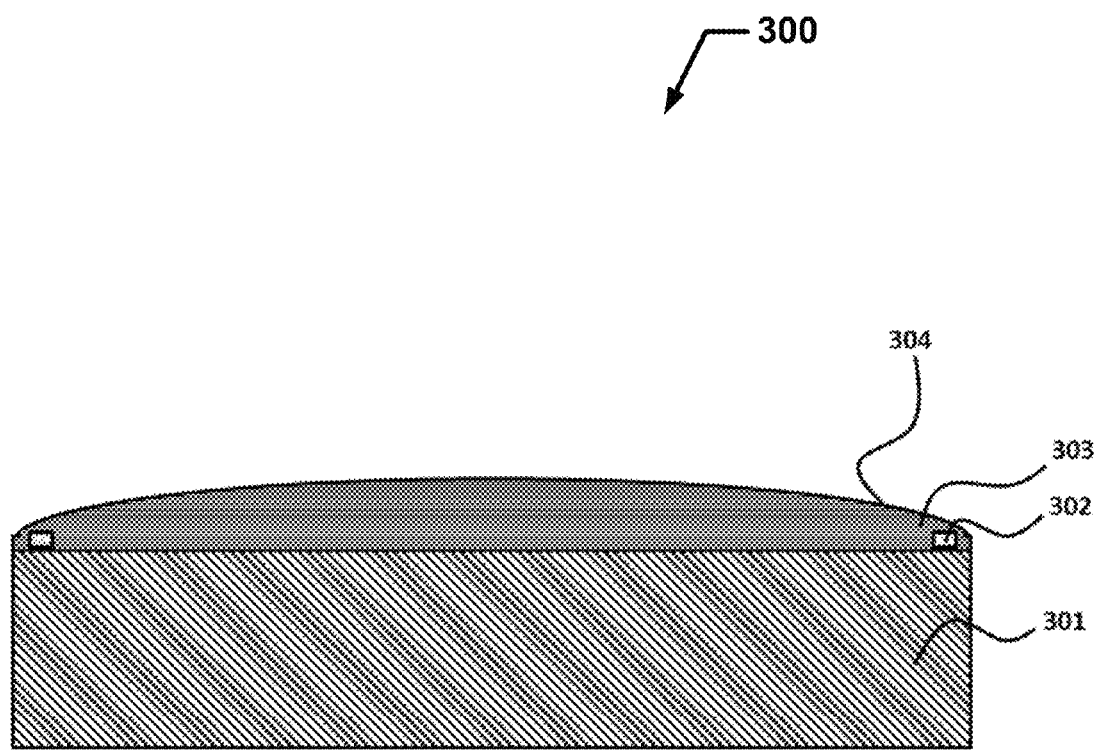

Third, as shown in FIG. 4C, a layer of first cladding polymer material 303 of refractive index N1 is ink jet printed. Due to the nature of printing, the printed first cladding layer may assume a non-planar surface profile 304 which is planarized in subsequent processing steps. Depending on the thickness of the first cladding layer required for different applications, multiple layers can be printed on top of each other using ink jet printing to achieve the desired thickness. It is to be noted that apart from ink jet printing, the method used for depositing the first cladding layer may include any of the plurality of solution deposition techniques, such as screen printing, gravure, offset, or blade coating.

Figure 4D:
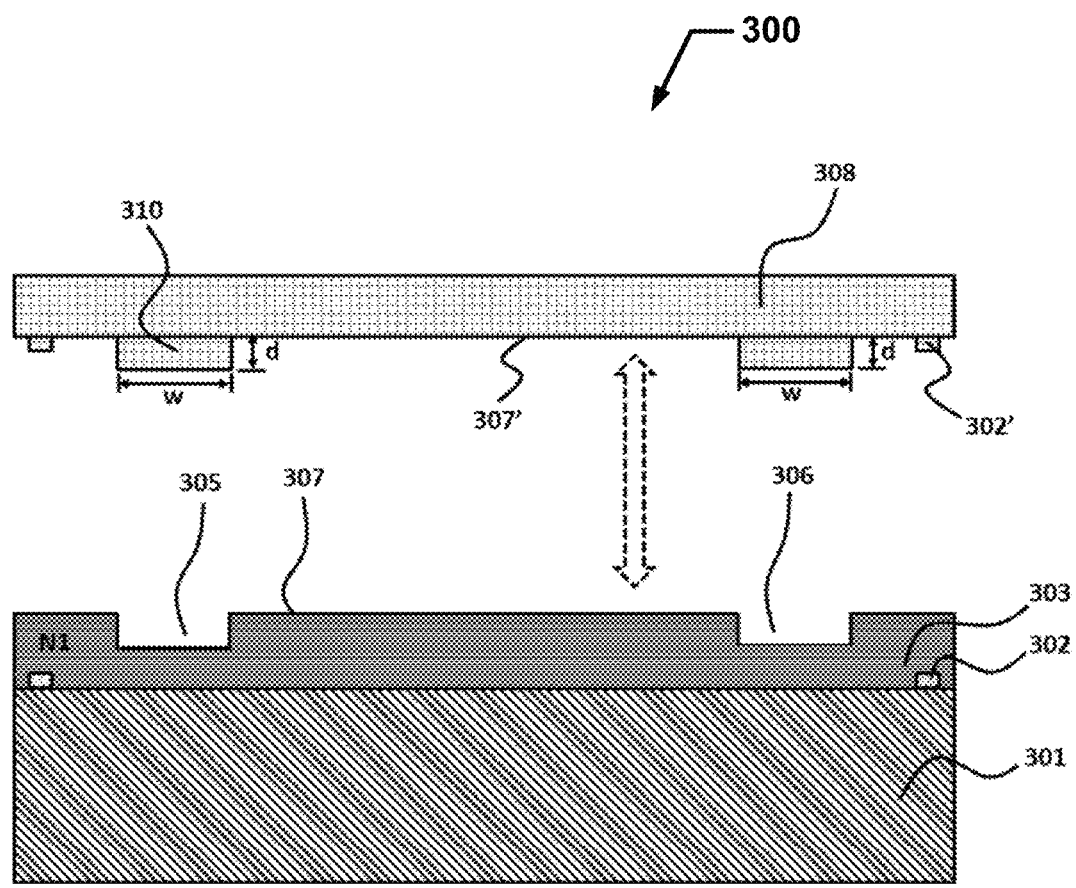
Figure 4E:
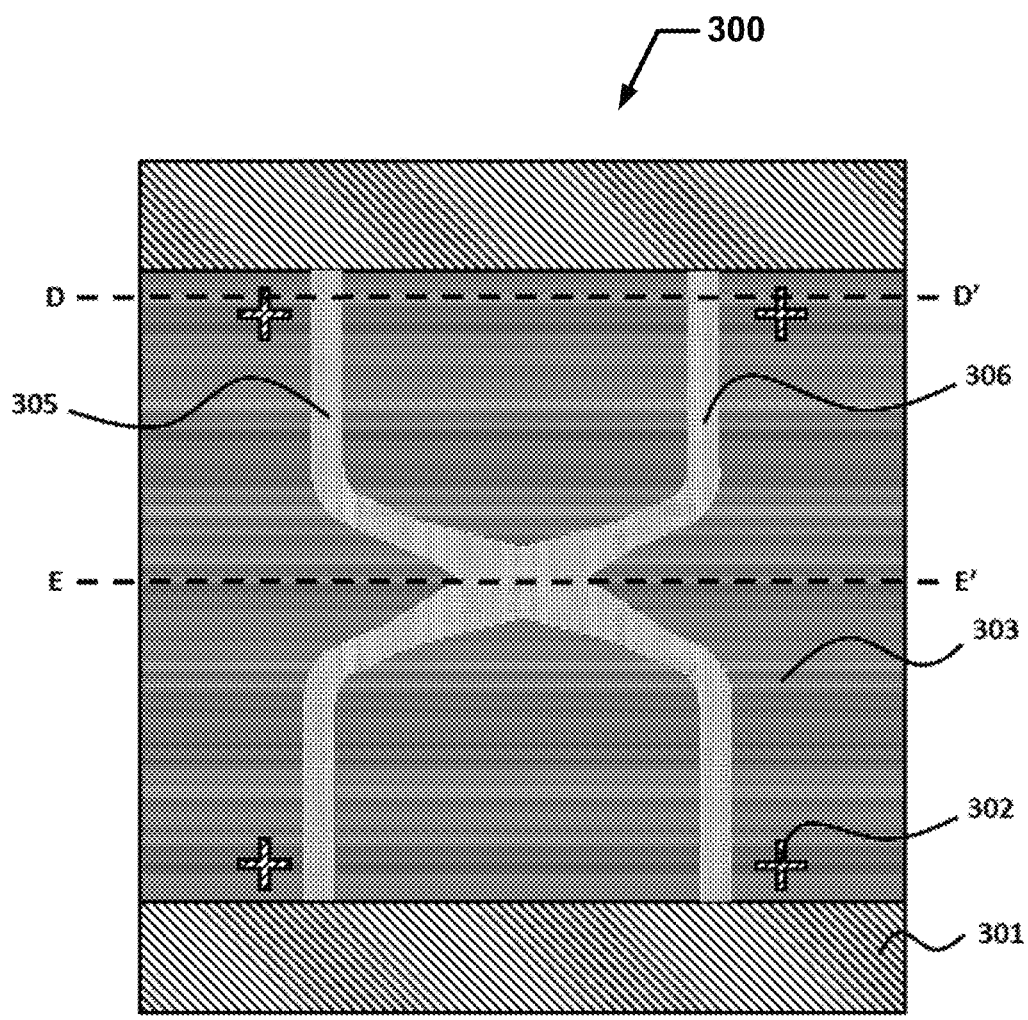

Fourth, as shown in FIG. 4D, a transparent mold 308 made of a suitable material, such as SSQ, containing the core trench pattern 310 of the optical switch and alignment marks 302', is pressed into the first cladding material 303. In order to determine the position of the waveguides on the substrate, the alignment marks 302' and 302 are aligned using an optical alignment system, and the mold is pressed into the first cladding material 303. Pressure is applied in order remove any air bubbles in the first cladding material. Ultra-violet (UV) radiation is shone through the transparent mold system 308 onto the first cladding material until the first cladding material hardens, leaving a small residual layer in the first cladding layer. The residual layer thickness can be controlled by appropriately choosing a suitable thickness for the first cladding layer. In some embodiments where the mold is not transparent to UV, other methods to cure and harden the first cladding layer may be utilized, such as heating the first cladding, exposing the first cladding layer to high power, ultrashort light pulses, and/or air drying the first cladding layer. Following UV exposure and hardening, the transparent mold is detached from the device, producing an impression of the core pattern of the device in the first cladding layer. The core patterns 305 and 306 in the first cladding layer, and the first cladding top surface 307 assume a flat profile due to the flatness of the mold surface 307'. The imprinting process produces an inverse rib waveguide with a depth of 500 nm and a width of 5 µm. At the inputs and outputs, the waveguides are separated by 250 µm. With this separation, the inputs and outputs are compatible with a standard fiber array. A top view of the active polymer optical switch after completion of the fourth step is shown in FIG. 4E. The arms of the waveguide 305 and 306 are each curved to guide light from the input port to the cross junction where the waveguides 305 and 306 cross. In some embodiments, the curves of the waveguide comprise a 10 mm bending radius and a horn structure is used at the junction with a maximum width of 40 µm at the center, along the dashed line E-E'. The half branch angle for the cross junction is optimized at 4 degrees based on the consideration of cross-talk minimization and switching power trade-off. The cross sectional views for FIGS. 4A to 4D, FIG. 4F, and FIG. 4G are taken along the dashed line D-D'. The cross sectional view for FIGS. 4H is taken along the dashed line E-E'. As shown in FIG. 4E, the alignment marks 302 are formed on the substrate 301. A switch core pattern comprising two arms 305 and 306 is formed in the first cladding layer 303.

Figure 4F:
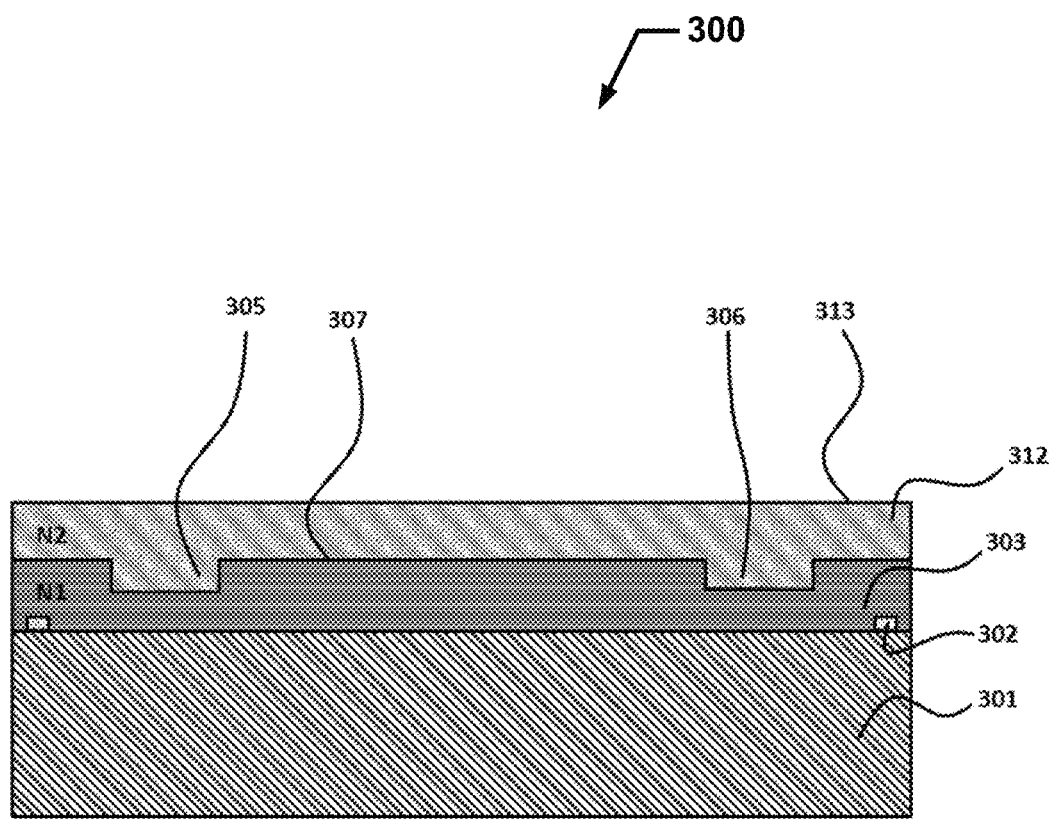

Fifth, as shown in FIG. 4F, the core material solution 312 of refractive index N2 (N2>N1) is deposited on top of the patterned first cladding layer 303 using ink jet printing. In order to determine the position of printing on top of the first cladding layer, the alignment marks 302 are detected using an optical alignment system, and the position of printing is determined with respect to the position of the detected alignment marks. The core material may comprise any material solution with a non-zero thermo-optic coefficient. In one embodiment, the core material solution 312, comprises a SU8 polymer from MicroChem which is 1.8 µm thick in the slab region with an additional 0.5 µm in the rib waveguide region. The core material solution has a refractive index of 1.575 at a wavelength of 1550 nm, which is larger than the refractive index of the first cladding layer comprising UV15LV. The thermo-optic coefficient of SU8 is $1.1 \times 10^{-4}$ at a wavelength of 1550 nm. After printing, the substrate is pre-baked at 90° C. to remove the solvent and then exposed to UV for 30 s, followed by post-baking to fully cross-link the SU8 layer. The deposited material covers the core pattern impressions 305 and 306 in the first cladding layer, and also assumes a flat top surface 313. The deposited core material solution is then hardened using an appropriate curing method, such as exposure to UV radiation, heating, air drying. It is to be noted that apart from ink jet printing, the method used for depositing the core material may include any of the plurality of solution deposition techniques, such as screen printing, gravure, offset, or blade coating.

Figure 4G:
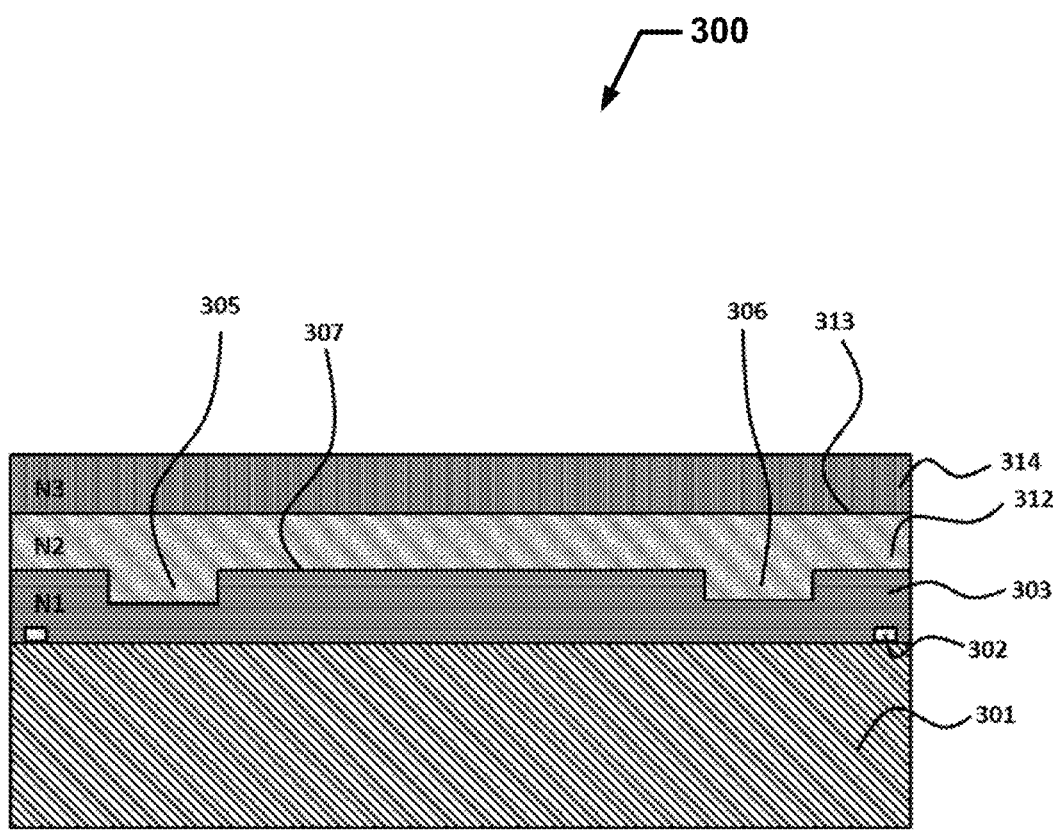
Figure 4H:
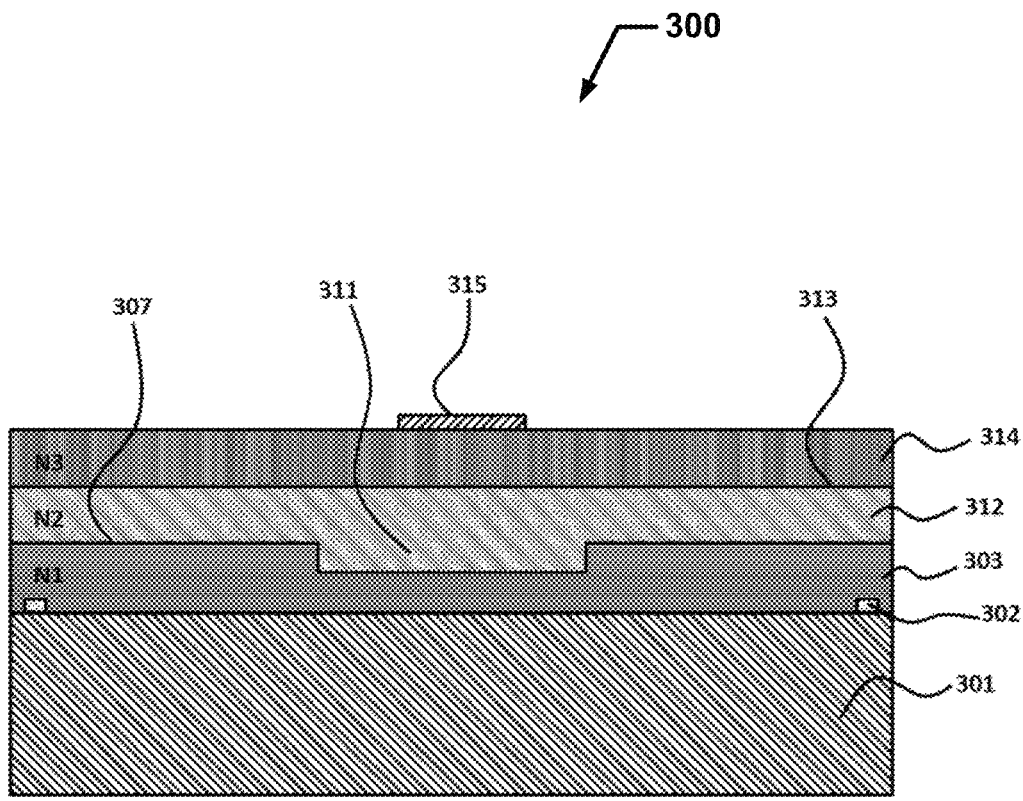

Sixth, as shown in FIG. 4G, the second cladding material solution 314 of refractive index N3 (N3<N2) is deposited on top of the core layer 312 using ink jet printing. In one embodiment, the second cladding layer 314, comprises a UV15LV polymer from MasterBond. The refractive index of the UV15LV polymer is 1.501 at a wavelength of 1550 nm. In order to determine the position of printing on top of the core layer, the alignment marks 302 are detected using an optical alignment system, and the position of printing is determined with respect to the position of the detected alignment marks. Upon deposition, the second cladding layer is hardened using an appropriate curing method, such as exposure to UV radiation, heating, air drying. It is to be noted that apart from ink jet printing, the method used for depositing the second cladding material may include any of the plurality of solution deposition techniques, such as screen printing, gravure, offset, or blade coating.

Finally, as shown in FIG. 4H, utilizing the alignment marks 302 on the substrate and a camera such as a fiducial recognition camera, a conductive heating electrode 315 is printed on the second cladding 314 at the center of the intersection 311 of the crossing arms 305 and 306. The conductive heating electrode 315 is designed to have a 500 µm length and an 8 µm width at the center of the cross junction. FIG. 4H shows the cross section of the device at the dashed line position E-E' of FIG. 4E. In order to determine the position for printing of the conductive heating electrode on top of the second cladding layer, the alignment marks 302 are detected using an optical alignment system, and the position of printing is determined with respect to the position of the detected alignment marks. The conductive heating electrode may include any of the plurality of materials, including but not limited to, silver, copper, aluminum, gold, nickel, conductive polymers, conductive metal oxides, graphene, and carbon nanotubes. Moreover, the conductive heating electrode pattern may be of any shape and size. Upon printing, the conductive heating electrode is appropriately cured using any of the plurality of methods, including but not limited to, heating; exposing to UV radiation; exposing to high power short light pulses; air drying.

The polymer optical switch 300 formed in this way may be fabricated on any substrate material, and over large physical areas not possible using conventional fabrication approaches. The utilization of ink jet printing, enables deposition of material only at intended locations on the substrate, thereby eliminating wastage of expensive cladding and core materials. The method disclosed herein also eliminates using wet or dry etching to remove material, thus, further preventing material wastage. Moreover, the utilization of solution processing techniques makes the disclosed invention roll-to-roll compatible, thus lending itself to low cost, high rate manufacturing.

Figure 5:
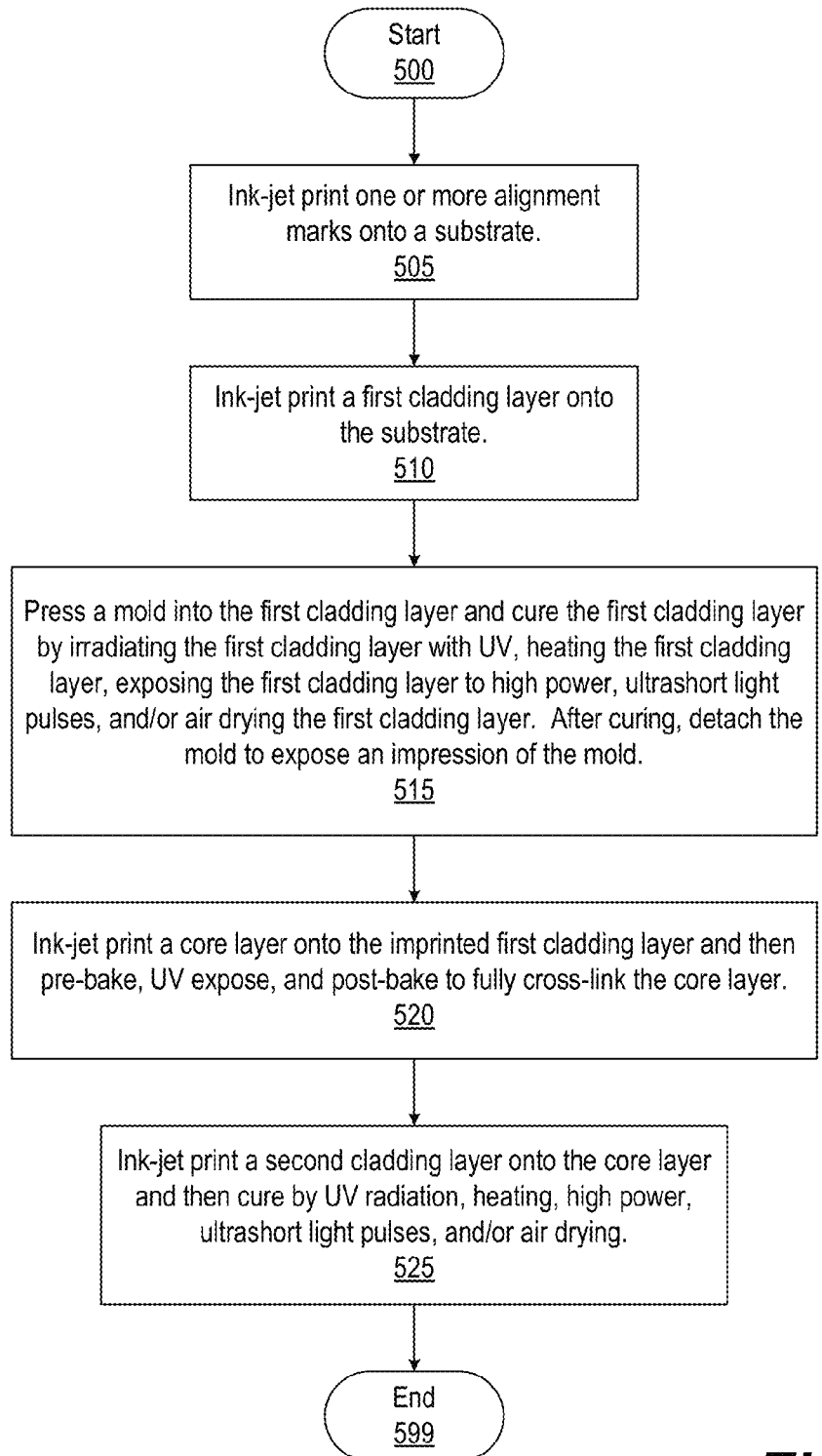
FIG. 5 is a block diagram illustrating a method for manufacturing polymer optical waveguides, in accordance with some embodiments.

FIG. 5 is a block diagram illustrating a method for manufacturing polymer optical waveguides, in accordance with some embodiments.

Processing begins at 500 whereupon, at block 505, one or more alignment marks are ink-jet printed onto a substrate. The substrate may comprise one or more electronic devices on the top of the substrate, embedded within the substrate, or on the backside of the substrate. At block 510, a first cladding layer is ink-jet printed onto the substrate. At block 515, a mold is used to imprint a waveguide structure into the first cladding layer. Pressure is applied to the mold to remove any air bubbles in the first cladding layer and the first cladding layer is cured by irradiating the first cladding layer with UV, heating the first cladding layer, exposing the first cladding layer to high power, ultrashort light pulses, and/or air drying the first cladding layer. Following curing, the mold is detached from the first cladding layer, resulting in an impression of the waveguide structure within the first cladding layer. At block 520, a core layer is ink-jet printed onto the first cladding layer filling the impressions of the waveguide structure within the first cladding layer. After printing, the substrate is pre-baked and exposed to UV, followed by post-baking to fully crosslink the core layer. At block 525, a second cladding layer is ink-jet printed onto the core layer and subsequently cured by UV radiation, heating, high power, ultrashort light pulses and/or air drying. Processing subsequently ends at 599. For the method of manufacturing active polymer photonic devices, conductive electrodes are ink-jet printed before ink-jet printing the first cladding layer and/or after ink-jet printing the second cladding layer.

In summary, the present invention provides a low-cost manufacturing method for a photonic waveguide and devices thereof by utilizing additive manufacturing methods. Specifically, ink-jet printing is utilized to apply material at desired locations only, thereby preventing material wastage which is unavoidable in the conventional exposure and development scheme. Whereas a molding method enables pattern definition in a cladding material, ink jet printing enables the deposition of different material layers required to form a waveguide. Additionally, the invention also shows the feasibility of developing low-cost polymer photonic devices by combining any of the plurality of solution processing techniques.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The benefits and advantages that may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

The invention claimed is:

1. A method for manufacturing optical waveguides comprising:
   ink-jet printing one or more alignment marks on a substrate, wherein ink-jet printing the one or more alignment marks comprises depositing a liquid material on the substrate, wherein the liquid material is at least one of: a dye, a pigment, and metal nanoparticles;
   ink-jet printing a first cladding layer on the substrate, wherein ink-jet printing the first cladding layer comprises:
      determining the position of the alignment marks on the substrate; and
      depositing a first liquid polymer on the substrate, wherein the first liquid polymer of the first cladding layer and the liquid material of the one or more alignment marks are not the same material;
   imprinting the first cladding layer;
   ink-jet printing a core layer on the imprinted first cladding layer; and
   ink-jet printing a second cladding layer on the core layer.

2. The method of claim 1, wherein ink-jet printing the one or more alignment marks further comprises:
   curing the liquid material, wherein curing the liquid material comprises irradiating the liquid material with UV, heating the liquid material, exposing the liquid material to high power, ultrashort light pulses, and/or air drying the liquid material.

3. The method of claim 1, wherein imprinting the first cladding layer comprises:
   determining the position of the alignment marks on the substrate;
   pressing a mold comprising a waveguide core pattern into the first cladding layer;
   curing the first cladding layer, wherein curing the first cladding layer comprises irradiating the first cladding layer with UV, heating the first cladding layer, exposing the first cladding layer to high power, ultrashort light pulses, and/or air drying the first cladding layer; and
   separating the mold from the first cladding layer to reveal an impression of the waveguide core pattern in the first cladding layer.

4. The method of claim 1, wherein ink-jet printing the core layer comprises:
   determining the position of the alignment marks on the substrate;
   depositing a core liquid polymer on the imprinted first cladding layer; and
   curing the core liquid polymer, wherein curing the core liquid polymer comprises irradiating the core liquid polymer with UV, heating the core liquid polymer, exposing the core liquid polymer to high power, ultrashort light pulses, and/or air drying the core liquid polymer.

5. The method of claim 1, wherein ink-jet printing the second cladding layer comprises:
   determining the position of the alignment marks on the substrate;
   depositing a second liquid polymer on the core layer; and
   curing the second liquid polymer, wherein curing the second liquid polymer comprises irradiating the second liquid polymer with UV, heating the second liquid polymer, exposing the second liquid polymer to high power, ultrashort light pulses, and/or air drying the second liquid polymer.

6. A method for manufacturing active polymer photonic devices comprising:
   ink-jet printing one or more alignment marks on a substrate, wherein ink-jet printing the one or more alignment marks comprises depositing a liquid material on the substrate, wherein the liquid material is at least one of: a dye, a pigment, and metal nanoparticles;
   ink-jet printing a first electrode on the substrate;
   ink-jet printing a first cladding layer on the substrate and the first electrode, wherein ink-jet printing the first cladding layer comprises:
      determining the position of the alignment marks on the substrate; and
      depositing a first liquid polymer on the substrate, wherein the first liquid polymer of the first cladding layer and the liquid material of the one or more alignment marks are not the same material;
   imprinting the first cladding layer;
   ink-jet printing a core layer on the imprinted first cladding layer; and
   ink-jet printing a second cladding layer on the core layer.

7. The method of claim 6, further comprising ink-jet printing a second electrode on the second cladding layer.

8. The method of claim 7, wherein ink-jet printing the second electrode comprises:
   determining the position of the alignment marks on the substrate;
   depositing a second liquid conductive material on the second cladding layer, wherein the second liquid conductive material is at least one of: a metal, a conductive polymer, a conductive metal oxide, carbon nanotubes, and graphene; and
   curing the second liquid conductive material, wherein curing the second liquid conductive material comprises irradiating the second liquid conductive material with UV, heating the second liquid conductive material, exposing the second liquid conductive material to high power, ultrashort light pulses, and/or air drying the second liquid conductive material.

9. The method of claim 6, wherein ink-jet printing the one or more alignment marks further comprises:
   curing the liquid material, wherein curing the liquid material comprises irradiating the liquid material with UV, heating the liquid material, exposing the liquid material to high power, ultrashort light pulses, and/or air drying the liquid material.

10. The method of claim 6, wherein ink-jet printing a first electrode comprises:
    determining the position of the alignment marks on the substrate;
    depositing a first liquid conductive material on the substrate, wherein the first liquid conductive material is at least one of: metal, a conductive polymer, a conductive metal oxide, carbon nanotubes, and graphene; and
    curing the first liquid conductive material, wherein curing the first liquid conductive material comprises irradiating the first liquid conductive material with UV, heating the first liquid conductive material, exposing the first liquid conductive material to high power, ultrashort light pulses, and/or air drying the first liquid conductive material.

11. The method of claim 6, wherein imprinting the first cladding layer comprises:
    determining the position of the alignment marks on the substrate;
    pressing a mold comprising a waveguide core pattern into the first cladding layer;
    curing the first cladding layer, wherein curing the first cladding layer comprises irradiating the first cladding layer with UV, heating the first cladding layer, exposing the first cladding layer to high power, ultrashort light pulses, and/or air drying the first cladding layer; and
    separating the mold from the first cladding layer to reveal an impression of the waveguide core pattern in the first cladding layer.

12. The method of claim 6, wherein ink-jet printing the core layer comprises:
    determining the position of the alignment marks on the substrate;
    depositing a core liquid polymer on the imprinted first cladding layer; and
    curing the core liquid polymer, wherein curing the core liquid polymer comprises irradiating the core liquid polymer with UV, heating the core liquid polymer, exposing the core liquid polymer to high power, ultrashort light pulses, and/or air drying the core liquid polymer.

13. The method of claim 6, wherein ink-jet printing the second cladding layer comprises:

determining the position of the alignment marks on the substrate;

depositing a second liquid polymer on the core layer; and curing the second liquid polymer, wherein curing the second liquid polymer comprises irradiating the second liquid polymer with UV, heating the second liquid polymer, exposing the second liquid polymer to high power, ultrashort light pulses, and/or air drying the second liquid polymer.

14. A method for manufacturing active polymer photonic devices comprising:

ink-jet printing one or more alignment marks on a substrate, wherein ink-jet printing the one or more alignment marks comprises depositing a liquid material on the substrate, wherein the liquid material is at least one of: a dye, a pigment, and metal nanoparticles;

ink-jet printing a first cladding layer on the substrate, wherein ink-jet printing the first cladding layer comprises;

determining the position of the alignment marks on the substrate; and depositing a first liquid polymer on the substrate, wherein the first liquid polymer of the first cladding layer and the liquid material of the one or more alignment marks are not the same material;

imprinting the first cladding layer;

ink-jet printing a core layer on the imprinted first cladding layer;

ink-jet printing a second cladding layer on the core layer; and ink-jet printing an electrode on the second cladding layer.

15. The method of claim 14, wherein ink-jet printing the one or more alignment marks further comprises:

curing the liquid material, wherein curing the liquid material comprises irradiating the liquid material with UV, heating the liquid material, exposing the liquid material to high power, ultrashort light pulses, and/or air drying the liquid material.

16. The method of claim 14, wherein imprinting the first cladding layer comprises:

determining the position of the alignment marks on the substrate;

pressing a mold comprising a waveguide core pattern into the first cladding layer;

curing the first cladding layer, wherein curing the first cladding layer comprises irradiating the first cladding layer with UV, heating the first cladding layer, exposing the first cladding layer to high power, ultrashort light pulses, and/or air drying the first cladding layer; and separating the mold from the first cladding layer to reveal an impression of the waveguide core pattern in the first cladding layer.

17. The method of claim 14, wherein ink-jet printing the core layer comprises:

determining the position of the alignment marks on the substrate;

depositing a core liquid polymer on the imprinted first cladding layer; and curing the core liquid polymer, wherein curing the core liquid polymer comprises irradiating the core liquid polymer with UV, heating the core liquid polymer, exposing the core liquid polymer to high power, ultrashort light pulses, and/or air drying the core liquid polymer.

18. The method of claim 14, wherein ink-jet printing the second cladding layer comprises:

determining the position of the alignment marks on the substrate;

depositing a second liquid polymer on the core layer; and curing the second liquid polymer, wherein curing the second liquid polymer comprises irradiating the second liquid polymer with UV, heating the second liquid polymer, exposing the second liquid polymer to high power, ultrashort light pulses, and/or air drying the second liquid polymer.

19. The method of claim 14, wherein ink-jet printing the electrode comprises:

determining the position of the alignment marks on the substrate;

depositing a liquid conductive material on the second cladding layer, wherein the liquid conductive material is at least one of: a metal, a conductive polymer, a conductive metal oxide, carbon nanotubes, and graphene; and curing the liquid conductive material, wherein curing the liquid conductive material comprises irradiating the liquid conductive material with UV, heating the liquid conductive material, exposing the liquid conductive material to high power, ultrashort light pulses, and/or air drying the liquid conductive material.

* * * * *